(12) United States Patent
Chen et al.

(10) Patent No.: US 6,947,934 B1
(45) Date of Patent: Sep. 20, 2005

(54) AGGREGATE PREDICATES AND SEARCH IN A DATABASE MANAGEMENT SYSTEM

(75) Inventors: Weidong Chen, Foster City, CA (US); You-Chin Fuh, San Jose, CA (US); Michelle Meichiou Jou, San Jose, CA (US); Apostol Ivanov Natsev, Bronxville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/505,165

(22) Filed: Feb. 16, 2000

(51) Int. Cl.[7] .............................................. G06F 17/30
(52) U.S. Cl. .......................................... 707/7; 707/101
(58) Field of Search .................. 707/1–10, 100–104.1, 707/200–205; 705/10

(56) References Cited

U.S. PATENT DOCUMENTS

| 5,367,675 | A |   | 11/1994 | Cheng et al. ................... 707/2 |
| 5,412,804 | A |   | 5/1995  | Krishna .......................... 707/2 |
| 5,590,324 | A |   | 12/1996 | Leung et al. ................... 707/5 |
| 5,713,015 | A |   | 1/1998  | Goel et al. ..................... 707/4 |
| 5,761,657 | A |   | 6/1998  | Hoang ........................... 707/4 |
| 5,794,246 | A | * | 8/1998  | Sankaran et al. ........... 707/101 |
| 5,864,847 | A |   | 1/1999  | Goel et al. ..................... 707/4 |
| 5,875,447 | A |   | 2/1999  | Goel et al. ..................... 707/4 |
| 5,884,299 | A |   | 3/1999  | Ramesh et al. ................ 707/2 |
| 5,905,982 | A |   | 5/1999  | Carey et al. ................... 707/4 |
| 5,960,427 | A |   | 9/1999  | Goel et al. ..................... 707/4 |

OTHER PUBLICATIONS

Ronald Fagin, "Fuzzy Queries in Multimedia Database Systems," ACM SIGACT-SIGMOND-SIGART Symposium on Principles of Database Systems, pp. 1-22, 1998.

Surajit Chaudhuri, et al., "Evaluating Top-k Selection Queries," Proceedings of the 25th VLDB Conference, Edinburgh, Scotland, pp. 399-410, 1999.

Paul M. Aoki, "Generalizing "Search" in Gereralizd Search Trees," Department of Electrical Engineering and Computer Sciences, University of California Berkeley, pp. 1-10.

David A. White, et al., "Similarity Indexing with the SS-Tree," IEEE, pp. 516-523, 1996.

Nick Roussopoulos, et al., "Nearest Neighbor Queries," Proceedings of the 1995 ACM-Sigmond Intl. Conf. on Management of Data, San Jose, CA, pp. 1-9, 1995.

Weidong Chen, et al., "High Level Indexing of User-Defined Types," IBM Santa Teresa Laboratory, pp. 1-24, Feb. 17, 1999.

Fred Zemke, et al., "Introduction to OLAP Functions," ISO/IEC JTC1/SC32 WG3:YGJ-068, ANSI NCITS H2-99 154r2, pp. 1-39, May 5, 1999.

W. Nutt, "Deciding Equivalences Among Aggregate Queries," Proceedings of the Seventeenth ACM SIGACT-SIGMOD-SIGART Symposium on Principles of Database Systems. PODS 1998, Seattle, WA Jun. 1-3, 1998, Sponsored by: ACM.

S. Chaudhuri, et al., "Optimizing Queries With Aggregate Views," Advances in Database Technology, EDBT '96, 5th International Conference on Extending Database Technology, Proceedings, Avignon, France, Mar. 25-29, 1996.

(Continued)

Primary Examiner—Mohammad Ali
(74) Attorney, Agent, or Firm—Gates & Cooper LLP

(57) ABSTRACT

A technique for executing a statement in a computer to manipulate data in a data store connected to the computer. Initially, a statement having an aggregate predicate is received. Then, when evaluating the statement, the aggregate predicate is processed to rank data. Furthermore, evaluating includes performing an extended sort operator with early termination.

39 Claims, 18 Drawing Sheets

OTHER PUBLICATIONS

HC Chan, et al., "A Prolog-Based Definition of an Entity Relationship Language," Logic Programming, Proceedings of the 1993 International Symposium, Vancouver, BC, Canada, Oct. 26-29, 1999, Sponsored by: Assoc. Logic Programming, Simon Fraser Univ., Natural Sci. & Eng. Res. Council of Canada, et al.

M. Muralikrishna, "Improved Unnesting Algorithms For Join Aggregate SQL Queries," Very Large Data Bases, VLDB '92, Proceedings of the 18th International Conference on Very Large Data Bases, Vancouver, BC, Canada, Aug. 23-27, 1992, Sponsored by: IEEE, ACM, VLDB Endowment, Canadian Informat, Processing Soc., et al.

S. Sudarshan, et al., "Aggregation and Relevance in Deductive Databases," Proceedings of the Seventeenth International Conference on Very Large Data Bases, Barcelona, Spain, Sep. 3-6, 1991, Sponsored by: IEEE.

SK Das, et al., "Extending the Integrity Maintenance Capability in Deductive Databases," Logic Programming, New Frontiers, Bristol, UK, Mar. 28-30, 1990.

E. Gradel, et al., "The Complexity of Query Reliability," Proceedings of the Seventeenth ACM SIGACT-SIGMOD-SIGART Symposium on Principles of Database Systems, PODS 1998, Seattle, WA Jun. 1-3, 1998, Sponsored by: ACM.

Shin Chung Shao, "Multivariate and Multidimensional OLAP," Advances in Database Technology—EDBT '98, 6th International Conference on Extending Database Technology Proceedings, Valencia, Spain, Mar. 23-27, 1998, Sponsored by: Univ. Politec. Valencia, Generalitat Valenciana, Ajuntament de Valencia, et al.

P. O'Neil, et al., "Improved Query Performance With Variant Indexes," SIGMOD 1997, ACM SIGMOD International Conference on Management of Data, Tucson, AZ, May 13-15, 1997, Sponsored by: ACM.

Shuichi Nishioka et al., Multi-Media Retrieval Applications of ORDBMS Liteobject, Information Processing Society of Japan 59th Meeting, 3-179 & 3-180, 1999, Japanese document 2pp / English translation 5pp.

Apostol Natsev et al., Aggregate Predicate Support in DBMS, Proceedings of the 13th Australian Database Conference (ADC' 02), Jan. 2002, 10pp.

* cited by examiner

AGGREGATE PREDICATES AND SEARCH IN A DATABASE MANAGEMENT SYSTEM

BACKGROUND OF THE INVENTION

1. Field of the Invention

This invention relates in general to computer implemented database management systems, and more particularly, to aggregate predicates and search in database management systems.

2. Description of Related Art

Databases are computerized information storage and retrieval systems. For example, a Relational Database Management System (RDBMS) is a database management system (DBMS) which uses relational techniques for storing and retrieving data. Relational databases are organized into physical tables which consist of rows and columns of data. The rows are formally called tuples or records; A database will typically have many physical tables and each physical table will typically have multiple tuples and multiple columns. The physical tables are typically stored on random access storage devices (RASD) such as magnetic or optical disk drives for semi-permanent storage.

Additionally, logical tables or "views" can be generated based on the physical tables and provide a particular way of looking at the database. A view arranges rows in some order, without affecting the physical organization of the database.

In existing database systems, aggregate predicate support is not available. Many applications, however, need a search capability using aggregate predicates. For example, aggregate predicates are needed for the following situations:

Similarity search on images and documents.

Nearest neighbors search on spatial objects.

In existing database systems, users can limit the results of queries by using standard relational operators (<, <=, =, < >, >, >=) and logical operators (and, or, not). In addition to these relational and logical operators, object relational databases, such as DB2® from International Business Machines, Corporation, also allow users to define predicates that can be used in queries and be exploited by a query optimizer. W. Chen, J.-H. Chow, Y.-C. You, J. Grandbois, M. Jou, N. Mattos, B. Tran, Y. Wang, "High Level Indexing of User-Defined Types," Proceedings of the 25th International Conference on Very Large Data Bases, Edinburgh, September 1999, pages 554–564.

These predicates are scalar predicates that are true or false for individual values, independent of other individual values. For example, consider a condition such as distance (customer.location, store.location)<5. For the distance condition, given any pair of customer and store locations, the distance condition evaluates whether the distance between the customer and store location is less than 5 or not (i.e., the condition evaluates either true or false), independent of any other customer or store locations.

Existing database systems support both scalar functions and a few aggregate functions. For example, some scalar functions are: abs (which returns an absolute value) and sqrt (which returns the square root of an argument). The aggregate functions operate on a collection of values (i.e., a column) and return a scalar value. Examples of aggregate functions include: max (which returns a maximum non-null value in a column), min (which returns a minimum non-null value in a column), and avg (which returns an average of the non-null values in a column). The main difference between scalar functions and aggregate functions is that aggregate functions work over a set of values, while scalar functions take only individual values as arguments. Recently, aggregate functions have been generalized to on-line analytical processing (OLAP) functions. F. Zemke, K. Kulkarni, A. Witkowski, B. Lyle, "Introduction to OLAP Functions," ISO/IEC JTC1/SC32 WG3-YGJ-nnn, ANSI NCITS H2-99-154, Apr. 12, 1999. OLAP functions are aggregate functions. Each invocation of an OLAP function has an associated window that specifies the set of values over which the OLAP function applies.

Unlike functions, existing database systems do not support-aggregate predicates that are true or false of individual values with respect to a given set of values. Many real world applications require aggregate predicates. The following are just some of the common examples:

1. Find the top ten images that are similar to a given image.
2. What are the top five fault lines that are nearest to a house.
3. What is the closest hospital to a given location.
4. For each store, find the top ten selling products in the last month.

These examples share some common aspects. First, each example involves an aggregate predicate. For example, one cannot determine if a hospital is closest to a given location without comparing it with other hospital locations relative to that given location. Second, all of the examples require the search based upon an aggregate predicate. In other words, the goal is not to check to see if a given hospital is closest to a location. Instead, we are searching for a hospital (from, possibly, a group of many hospitals) that is closest to a given location.

Thus, there is a need in the art for introducing aggregate predicates into existing database systems and to enable search based upon aggregate predicates.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented technique for enabling aggregate predicates and search in database management systems.

In accordance with the present invention, a statement is executed in a computer to manipulate data in a data store connected to the computer. Initially, a statement having an aggregate predicate is received. Then, when evaluating the statement, the aggregate predicate is processed to rank data. Furthermore, evaluating includes performing an extended sort operator with early termination.

BRIEF DESCRIPTION OF THE DRAWINGS

Referring now to the drawings in which like reference numbers represent corresponding parts throughout.

DETAILED DESCRIPTION

In the following description of an embodiment of the invention, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
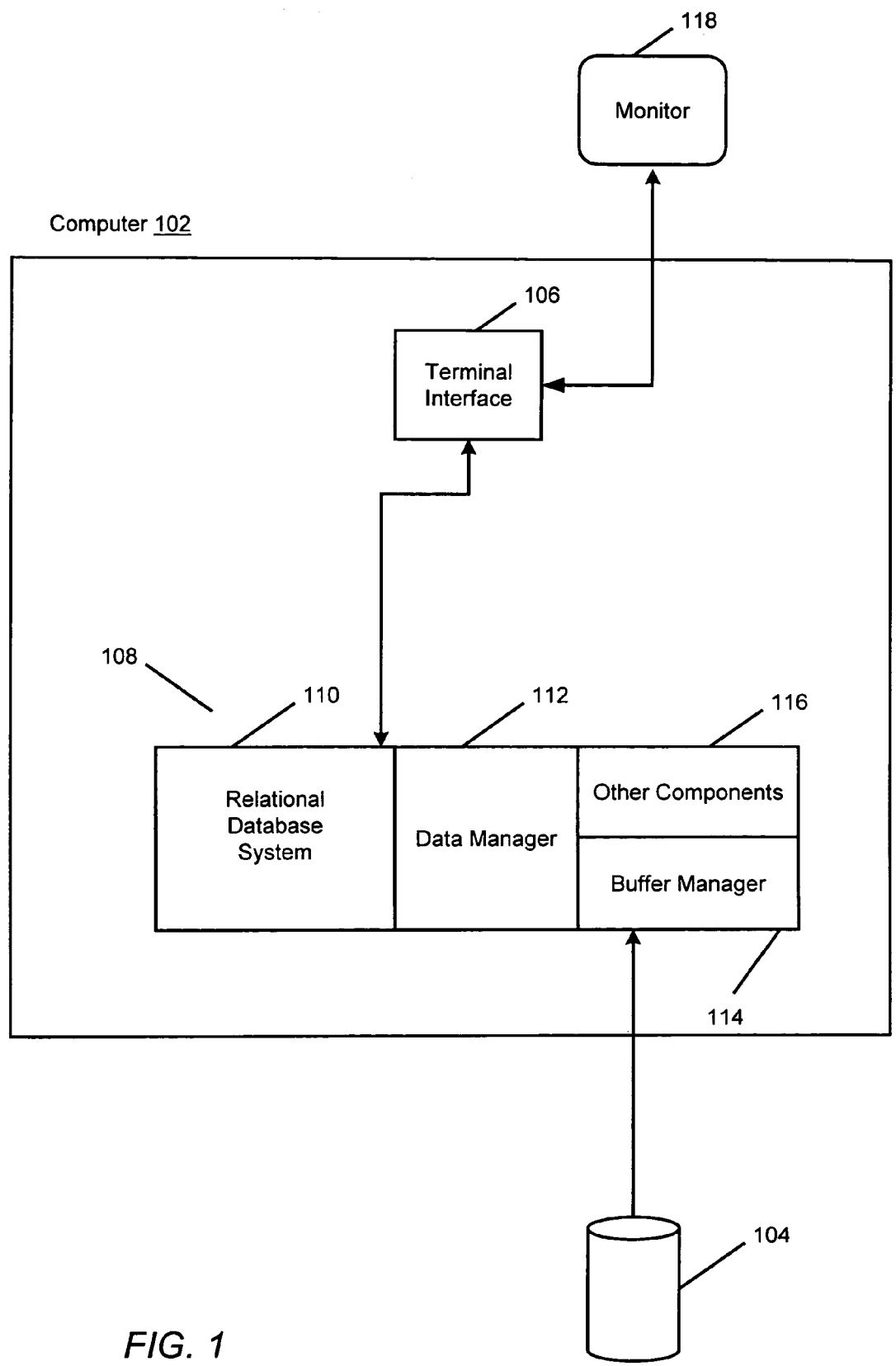
FIG. 1 is a schematic diagram illustrating a hardware environment of an embodiment of the present invention, and more particularly, illustrates a typical distributed computer system.

FIG. 1 illustrates an exemplary computer hardware environment that could be used in accordance with the present invention. In the exemplary environment, a computer system 102 is comprised of one or more processors connected to one or more data storage devices 104, such as a fixed or hard disk drive, a floppy disk drive, a CDROM drive, a tape drive, or other device, that store one or more relational databases.

Operators of the computer system 102 use a standard operator interface 106 to transmit electrical signals to and from the computer system 102 that represent commands for performing various search and retrieval functions, termed queries, against the databases. In one embodiment of the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® for Universal Database (UDB) product offered by International Business Machines, Corporation. Those skilled in the art will recognize, however, that the invention has application to any database software.

When a SQL statement is prepared for execution, the UDB optimizer analyzes the statement and considers the alternative ways to satisfy the request, estimates the cost of each alternative, and then chooses the alternative with the lowest cost (in terms of processing and I/O requests). In doing this, the optimizer generates an access plan for executing the statement. The access plan indicates how the request will be satisfied (e.g., by using an index or joining data from two tables). The access plan can often be depicted as a graph that shows how data flows from one or more tables and/or indexes, through processing nodes (e.g., a join node), and to a result set that satisfies the original SQL statement.

At the center of the DB2® for UDB system is the Database Services module 108. The Database Services module 108 contains several submodules, including the Relational Database Service (RDS) 110, the Data Manager 112, the Buffer Manager 114, and other components 116 such as an SQL compiler/interpreter. These submodules support the functions of the SQL language, i.e. definition, access control, interpretation, compilation, database retrieval, and update of user and system data.

The present invention is generally implemented using SQL statements executed under the control of the Database Services module 108. The Database Services module 108 retrieves or receives the SQL statements, wherein the SQL statements are generally stored in a text file on the data storage devices 104 or are interactively entered into the computer system 102 by an operator sitting at a monitor 118 via operator interface 106. The Database Services module 108 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
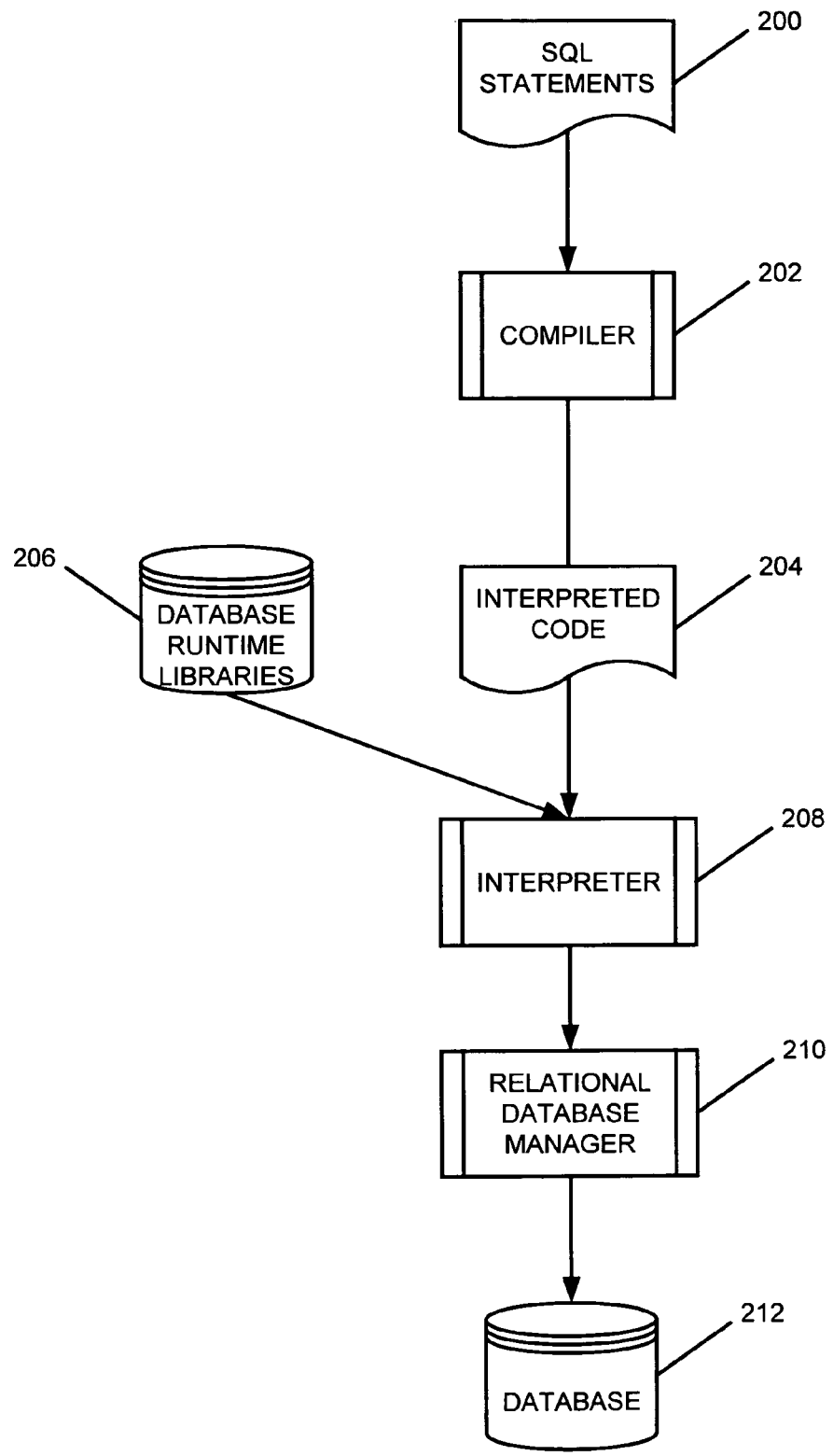
FIG. 2 is a diagram illustrating a process of evaluating SQL statements.

FIG. 2 is a diagram illustrating a process of evaluating SQL statements. A SQL program 200 comprises SQL statements. A compiler 202 compiles the SQL program 200 into interpreted code 204. The interpreted code 204 and database runtime libraries 206 (containing, for example, stored procedures and utilities) are input to an interpreter 208. The output of the interpreter 208 is used to access the relational database manager 210 and retrieve data requested by the SQL statements from database 212. In one embodiment of the invention, a portion of the invention resides in the compiler and compiles SQL statements including aggregate predicates to form access plans that include extended sort operators.

Aggregate Predicates and Search in a Database Management System

The invention provides the syntax for an aggregate predicate. Additionally, the invention provides access techniques for aggregate predicate search.

In particular, the SQL language provides the capability to include a search condition in a SQL query or statement. The search condition (e.g., x<5) results in a BOOLEAN value. The invention extends the SQL language by defining an aggregate predicate that my be included in a search condition of a SQL statement (e.g., in a WHERE clause or a HAVING clause). Once the rank operator is defined, the compiler for the SQL language has to be able to process the rank operator. Therefore, the invention also provides a rk_sort operation (i.e., an extended sort operation), which the compiler includes in an access plan for a SQL statement containing an aggregate predicate.

The following description will be organized as follows:
A. Introduction of an Aggregate Predicate into a Database System
B. Language and Semantics of Aggregate Predicate.
C. Extended Index and Access Methods for Aggregate Predicate Search.
D. Query Examples.
E. Flow Diagrams.
F. Summary and Additional Advantages of the Invention.

A. Introduction of an Aggregate Predicate into a Database System

This invention makes several contributions towards aggregate predicates and search in a DBMS (Data Base Management System). First, the invention extends the SQL used in a DBMS with the concept of aggregate predicates. Aggregate predicates can be used in the same way as the traditional scalar predicates (i.e., relational and logical operators) in queries. Second, the invention designs a flexible language mechanism for aggregate predicates. An aggregate predicate can be either a primitive or a compound predicate (with logical operators). An aggregate predicate operates over a set of values determined by a window specification.

Third, the invention designs run time query execution strategies for aggregate predicates that support both ranked incremental retrieval with no explicit bound and ranked incremental retrieval with a specific bound (such as the top 10). Rather than trying to approximate search based upon aggregate predicates, the invention strategies compute results of search based upon aggregate predicates correctly.

Fourth, the invention designs indexing and query optimization strategies for aggregate predicates when the rank in an aggregate predicate is computed using only system defined functions. Finally the invention extends indexing and query optimization strategies for aggregate predicates whose rank is computed by a user-defined function. The invention supports extensible indexing with aggregate predicates.

There are several advantages of using the present invention, including:
Enhanced expressive power of the query language.
Performance improvement for many applications.
Wider applicability of database systems.
User defined search technique for an aggregate predicate.

A key advantage of the invention is that users are able to perform search based upon aggregate predicates in database applications and to have better performance. More specific advantages are listed below.

First, the introduction of aggregate predicates into the SQL language provides enhanced expressive power for users. While users may be able to simulate some aggregate predicates using application programs or stored procedures that invoke aggregate functions provided by the SQL language, such an approach has a usability problem and performance problem. This is because aggregate functions and aggregate predicates serve different purposes. The purpose of aggregate functions is to compute some scalar value for a set of values, such as max, min, avg, count, or out. The purpose of aggregate predicates is to search for some values that satisfy a particular aggregate property. With aggregate functions, for usability, if a user wants to find the top 5 nearest restaurants, the user has to create an explicit column to store data for ranking of restaurants, and then create a condition on the explicit ranking column. For performance, aggregate functions are always computed. On the other hand, the search based upon aggregate predicates can avoid or limit such computations.

Second, by supporting the search based upon aggregate predicates directly, the invention is able to provide a performance improvement for many applications. A simple approach for evaluating an aggregate predicate is to compute the ranking of every possible candidate for the aggregate predicate, and then select only those candidates that satisfy the aggregate predicate. For example, to find the top 5 nearest restaurants, the simple approach will compute the distance between the current location and the location of every restaurant, and then select the top five nearest restaurants with the shortest distances. One embodiment of the invention offers a search mechanism for aggregate predicates that limits the search space, while guaranteeing the correctness of the answers.

Third, the invention provides a uniform treatment of the traditional scalar predicates (relational and logical operators) and aggregate predicates. Consequently, the existing framework of indexing and query optimization can be generalized to aggregate predicates. For example, the notions of local predicates and key predicates are equally applicable to scalar and aggregate predicates.

Fourth, the invention supports extensible indexing with aggregate predicates for the first time. With the variety of applications, aggregate predicates often involve ranking based upon user-defined functions. In one embodiment, the database system does not decide how to search based upon aggregate predicates. For this embodiment, the invention empowers application developers so that they can take advantage of their domain knowledge to develop effective search strategies for aggregate predicates.

Overall the usability and performance advantages from this invention make it possible to apply database technology to a wider variety of applications.

B. Language and Semantics of an Aggregate Predicate

One embodiment of the invention provides a SQL extension to support aggregate predicates. The approach treats scalar predicates and aggregate predicates in a uniform way so that the existing infrastructure for scalar predicates can be used for aggregate predicates.

Consider a scalar predicate, such as c1<c2+1 0. To determine the truth value of the scalar predicate, only the values for c1 and c2 are needed. In contrast, an aggregate predicate needs more information in order to determine its truth value. For instance, in order to find the top five salaries, the following information is needed:

The ranking used in the aggregate predicate: salary.

The desired order: descending for the top five salaries or ascending for the bottom five salaries.

The desired number of answers: 5 in this case. This number may be omitted in cases in which values are retrieved incrementally and can stop or continue at any time.

The set of values over which the aggregate predicate is evaluated (e.g., it could be the set of all salary values in a table or the set of all salary values in each department).

The invention defines a new syntax, aggregate predicate, into the "search condition" of the SQL language. (For simplicity, the following syntax does not illustrate compound aggregate predicates. However, one skilled in the art would recognize that compound aggregate predicates may be used within the scope of the invention.) The extended syntax is as follows:

```
predicate::=   scalar-predicate
               aggregate-predicate
aggregate-predicate::=RANK (scalar-expression) [ASC|DESC]
          [FIRST numeric-expression] [OVER (window-specification)]
```

A predicate may be either a scalar predicate or an aggregate predicate. Furthermore, for an aggregate predicate, the RANK keyword (i.e., aggregate predicate identifier) identifies the scalar-expression as an aggregate predicate. The desired order of the ranking is performed according to the ASC (i.e., ascending) keyword or DESC (i.e., descending) keyword (i.e., an result ordering indicator). The number of desired results is specified in the FIRST clause. If the FIRST clause is missing, all results are output in the specified order. The window-specification in the OVER clause, if present, determines how the aggregation is to be performed (i.e., specifies the set of values over which the aggregate predicate is evaluated). If no aggregation window is specified, the result is aggregated over an entire table.

When evaluating an aggregate predicate, initially, all of the required information is captured. Then, further processing, which will be described below, is performed.

For one particular example, suppose there is a table called emp, with columns of name, dept, salary, and age. The following example SQL statement requests the top five salaries and the corresponding names:

SELECT name, salary
FROM emp
WHERE RANK (salary) DESC FIRST 5

For the above statement, one way to evaluate the query is to retrieve all records and sort them based on salary. Then, the top five are returned, in descending order.

To retrieve the top five salaries in each department, the following example SQL statement may be used:

SELECT dept, name, salary
FROM emp
WHERE RANK (salary) DESC FIRST 5 OVER (dept)

In the above, the window-specification is dept. Therefore, if there are two departments, the top 5 employees for each department are returned.

Aggregate predicates can be used together with scalar predicates. Consider the following example SQL statement:

SELECT dept, name, salary
FROM emp
WHERE RANK (salary) DESC FIRST 5 OVER (dept)
   AND age <25

Since the aggregate predicate and scalar predicate are on the same level, the semantics of the above SQL statement is to find the dept, name, and the salary of employees in each department who earn one of the top five salaries in the department and who is younger than 25.

To find the top five salaries among young employees in each department, the following example SQL statement may be used:

SELECT dept, name, salary
FROM emp
WHERE age <25
HAVING RANK (salary) DESC FIRST 5 OVER (dept)

Note that when the HAVING clause does not have any aggregate predicates, all scalar predicates in the HAVING clause can be merged with predicates in the WHERE clause if there are no side effects caused by the evaluation of the scalar predicates. Generally, however, such a merge is not performed if the HAVING clause has at least one aggregate predicate.)

Even if there is a GROUP BY clause, it will interact with aggregate predicates nicely since aggregate predicates have their own group specification (indicated by OVER).

For the salary example, if the top fifth and the top sixth salary are same, in one embodiment, the sixth salary is also included in the answer set. In this case, an additional keyword, such as RANKGAP, is used to indicate that when there are duplicate items (e.g., the same salary) retrieved, they are displayed. In another embodiment, duplicate items are not displayed (e.g., only the fifth salary is displayed, and not the sixth).

The above examples have considered isolated aggregate predicates. Just like scalar predicates, aggregate predicates can be combined with others using logical operators, such as AND, OR, or NOT. Notice that such combinations of aggregate predicates are different from those considered by Fagin in R. Fagin, "Fuzzy Queries in Multimedia Database Systems," Proceedings of the 1998 ACM SIGACT-SIGMOD-SIGART Symposium on Principles of Database Systems. To support compound aggregate predicates like those in the Fagin article (R. Fagin, "Fuzzy Queries in Multimedia Database Systems," Proceedings of the 1998 ACM SIGACT-SIGMOD-SIGART Symposium on Principles of Database Systems), the following sample syntax may be used:

SELECT dept, name, salary
FROM emp
WHERE (RANK (salary) DESC AND RANK(age) ASC)
   FIRST 5 OVER (dept)

The above statement is trying to find, for each department, the top five young and high salaried employees. The ranking of a compound aggregate predicate depends upon how the ranking of each component aggregate predicate is combined with each other. In one embodiment, new syntax is defined for giving a particular weight to each component aggregate predicate. (In fact, in the Fagin article cited above, each component aggregate predicate provides a ranking value in the range of [0,1], and then a combination function is used to compute the ranking value of a compound aggregate predicate.)

For another example, let distance be a user defined function (UDF) which computes the Euclidean distance between two 2-dimensional points (e.g., in an x-y plane). The following statement finds the nearest 10 ATMs (automatic teller machines) from a given location using an "aggregate predicate" in the WHERE clause of the example SQL statement:

SELECT a.name, a.location, a.address
FROM ATM a
WHERE RANK (distance(a.location, :whereIam)) FIRST 10

Intuitively, the query engine fetches the tuples in the ATM table and sorts them based on the value of the UDF invocation in the WHERE clause. The top 10 tuples in the sort order are returned as the result. If there are less than 10 records, the entire table is returned. In one embodiment, duplicate tuples are eliminated from the result set, if they appear at the end of the top-10 list.

Besides appearing in the WHERE clause, aggregate predicates can also appear in the HAVING clause as shown in the following example SQL statement:

SELECT s.id, c.name, c.address, c.income
FROM customers c, stores s
WHERE within(c.location, s.zone)=1
HAVING RANK(c.income) FIRST COUNT(*)*0. 10 VER(s.id)

The result set of this statement contains, for each store, tuples which represent the top 10% of customers in terms of their annual income. The WHERE clause specifies the join condition between the two tables, and the HAVING clause specifies the aggregation to be done for each store.

C. Extended Index and Access Techniques for Aggregate Predicate Search

One embodiment of the invention provides extended index and access techniques for aggregate predicate search.

The following is an example in existing SQL language:

SELECT s.id, AVG(c.income)
FROM customers c, stores s
WHERE within(c.location, s.zone)=1
GROUP BY s.id, s.expense
HAVING s.expense <=SUM(c.income)*0.45

Figure 3:
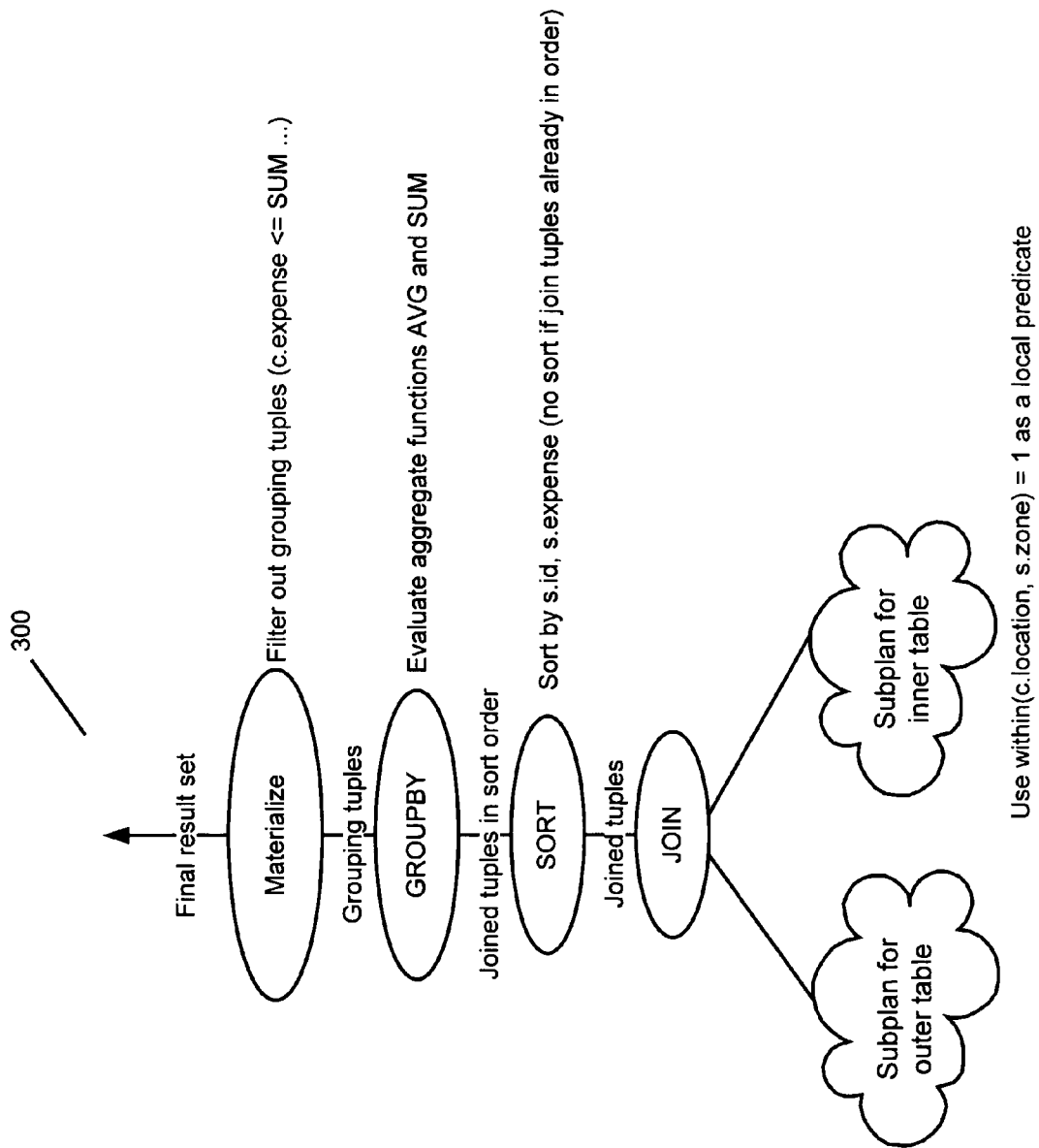
FIG. 3 is a diagram illustrating a typical access plan 300 for an example SQL statement.

FIG. 3 is a diagram illustrating a typical access plan 300 for an example SQL statement. The JOIN node produces the join tuples by joining two tables (i.e., customers and stores). That is, "within(c.location, s.zone)=1" is used as a local predicate. The joined tuples are then sorted by the SORT node based on the specified GROUP BY expressions (i.e., s.id and s.expense). The GROUPBY node scans the joined tuples in sorted order in the current group, computes the aggregate functions (i.e., AVG and SUM) for that group, and then pipes the representative grouping tuple to its output stream. The MATERIALIZE node performs the final filtering (i.e., s.expense <=SUM(c.income)*0.45) to generate the final result set.

To support aggregate predicates, an embodiment of the invention defines a new access plan operator, rk_sort, which is a variation of the SORT node (i.e., an extended sort operator). The rk_sort operator takes four inputs and produces as output a rank-sorted set of tuples.

The first argument is the input stream. A designated column for "round radius" is associated with each tuple of the input stream. The concept of round radius is used to facilitate early termination of the rk_sort operation in certain cases where the input stream is divided into multiple rounds such that if, up to round n, there have been at least k tuples with the scoring expression less than or equal to the radius of round n, then the rk_sort for that group can terminate by ignoring the remaining tuples which belong to that group.

Figure 4:
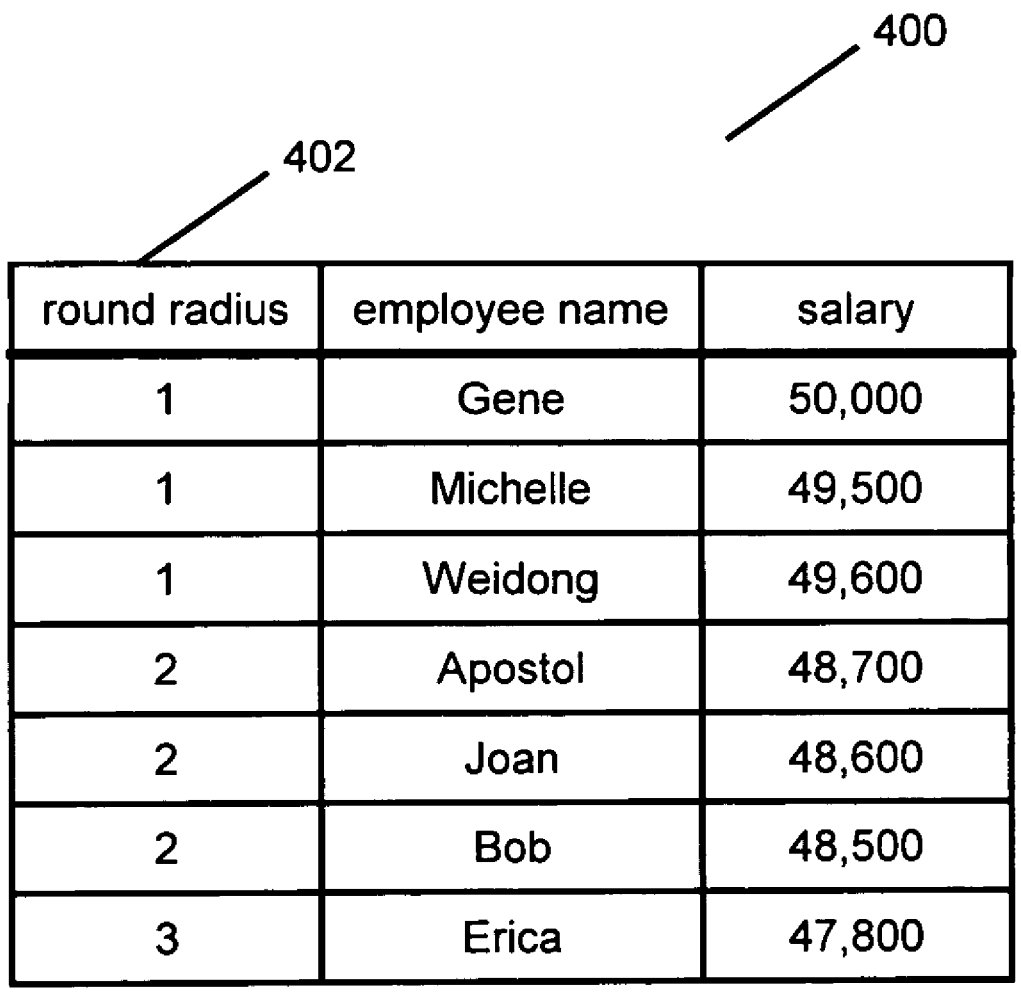
FIG. 4 is a diagram illustrating a table that will be used to explain a round radius.

FIG. 4 is a diagram illustrating a table 400 that will be used to explain a round radius. Taking a one-dimensional search as an example, if 5 employee names are to be selected for employees having the top five salaries, which are less than $50,000, the round radius may be set as shown in the round radius column 402 of FIG. 4. In particular, the input to the invention will initially come from round 1. This selects three employee names that fit the desired data. Then, data comes for round 2. Note that because the data is tagged as coming from a particular round, the round radius indicates that a new round is beginning. Also, note that the records in a round may not be sorted in order. Before continuing with the new round, the records for that round are sorted and then it is determined whether the desired number of records have been selected (e.g., 5 in this case). Since only 3 employee names have been selected, and 5 are desired, processing continues. Then, the three names for round 2 are processed, and two more employee names that fit the desired data (Apostol and Joan) are selected from round two. All items in the round are processed (e.g., 3 records for round 2), and then the determination is made of whether the desired number of records have been selected. At this time, 5 employee names have been selected. Therefore, there is no need to continue processing records. Thus, in this example, after processing only 6 records, the 5 desired employee names were selected.

Figure 5:
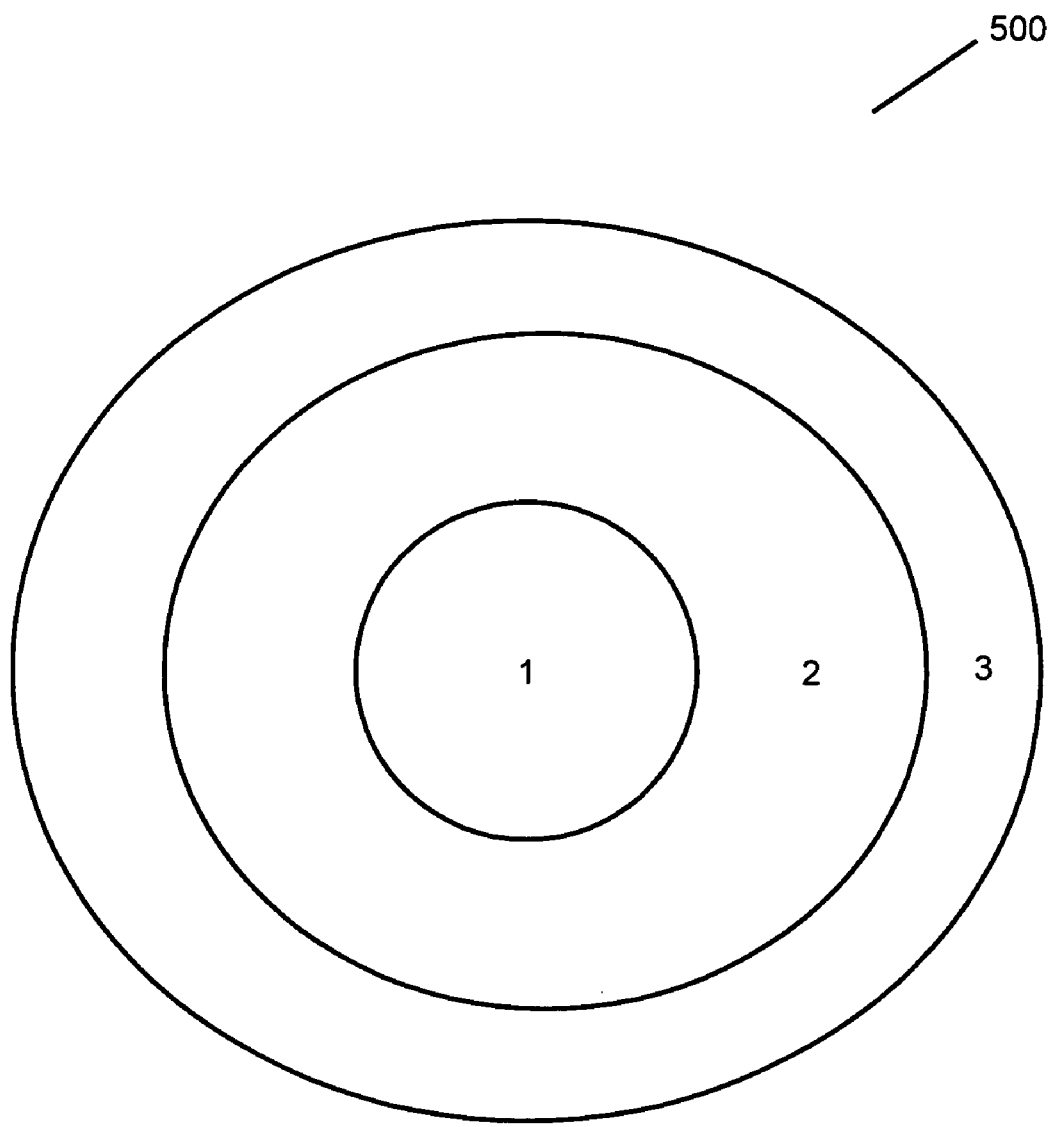
FIG. 5 is a diagram illustrating a set of rings representing radii.

Intuitively, the search for candidates is performed based on a sequence of "rings" from inside out. FIG. 5 is a diagram illustrating a set of rings 500 representing radii. In particular, the rings are labeled 1, 2, and 3 to correspond to the rounds illustrated in FIG. 4. The round radius is set to the distance between the point of interest and the outer circle of the ring. Therefore, change of round radius indicates change of the search ring. For example, going from round 1 to round 2, the values evaluated are those in ring 2. In the case where "ring search" is not possible or available, the round radius of the input stream may be set to infinity so that all of the tuples will be evaluated in the rk_sort operation.

The round radius is assigned to a record by someone who understands the distribution of data. Statistics on the data may be obtained by, for example, executing statistics utilities, such as RUNSTATS. The round radius corresponds to a column value (e.g., salary). Once this is done, the access plan will retrieve records based on their round radius for processing. If an index is built on the column value associated with the round radius, the access plan will use the index to retrieve only those records in the round radius of interest. This reduces the amount of records that are processed and sorted. That is, there is early termination of sort. Thus, the technique of the invention improves efficiency.

The second argument, rank, is the rank of the search, which determines the group cardinality of the result set. That is, for the example of selecting the top 5 salaries, the rank is 5. The rank is obtained from the numeric-expression (following FIRST) in the aggregate predicate.

The third argument, groupByList, is the list of expressions which defines the formation of groups. For example, if employee names are to be selected by department, the groupByList would be department. The groupByList is obtained from the window-specification (following OVER) of the aggregate predicate.

The fourth argument, scoringExp, is the expression on the left hand side of the aggregate predicate. For example, salary <50,000 may be a scoringExp. The scoringExp is obtained from the scalar-expression (following RANK) of the aggregate expression.

The formal semantics of the rk_sort operator is described by the following pseudo code. rk_Sort(stream(roundRadius), rank, groupByList, scoringExp)=
1. Initialize the round number to −1 for all groups.
2. While not end-of-stream,
   a. Fetch the next available tuple in stream,
   b. If the target group for the new tuple is frozen then discard the new tuple and goto step 1, and
   c. If roundRadius in the tuple is different from the group round radius then,
      i. Set the group round radius to the new value, and
      ii. If the number of tuples with the scoringExp less than or equal to the current round radius is greater than or equal to rank, then "freeze" the current group and goto 1.
   d. Insert the new tuple into the sorted table based on the expressions in groupByList and scoringExp.
3. Freeze the groups which were not frozen yet.
4. Pipe the rank-sorted table to the next stage of the plan.

Note that the term frozen indicates that there is no need to look for more records for this round. The above pseudocode is also described using flow diagrams in FIGS. 16A–C below.

D. Query Examples

In the following, access plans are illustrated for different aggregate predicate scenarios. In all table scan cases, the round radius passed on to the rk_SORT operator is the infinity value and never changes so that all records are fetched in a single round. The same holds for index exploitation cases, in which the index being exploited is defined on an attribute other than the one from the aggregate predicate. In such cases, there is partial index exploitation to filter out some records, but there is no index exploitation for early termination based on the ranking. In order to be able to fully exploit the index for rank-based early termination, the rk_SORT operator appears immediately after the FETCH operator following an ISCAN, with the aggregate predicate being used as a local predicate.

The following is an example SQL statement for a simple aggregate predicate:
SELECT*
FROM customer c
WHERE RANK(dist(c.loc, :stl)) ASC FIRST 10

The above statement selects the nearest 10 customers to STL (i.e., Santa Teresa Laboratory). Another example SQL statement for a simple aggregate predicate is given below:
SELECT*
FROM customer c
WHERE RANK(c.income) DESC FIRST 10

Figure 6:
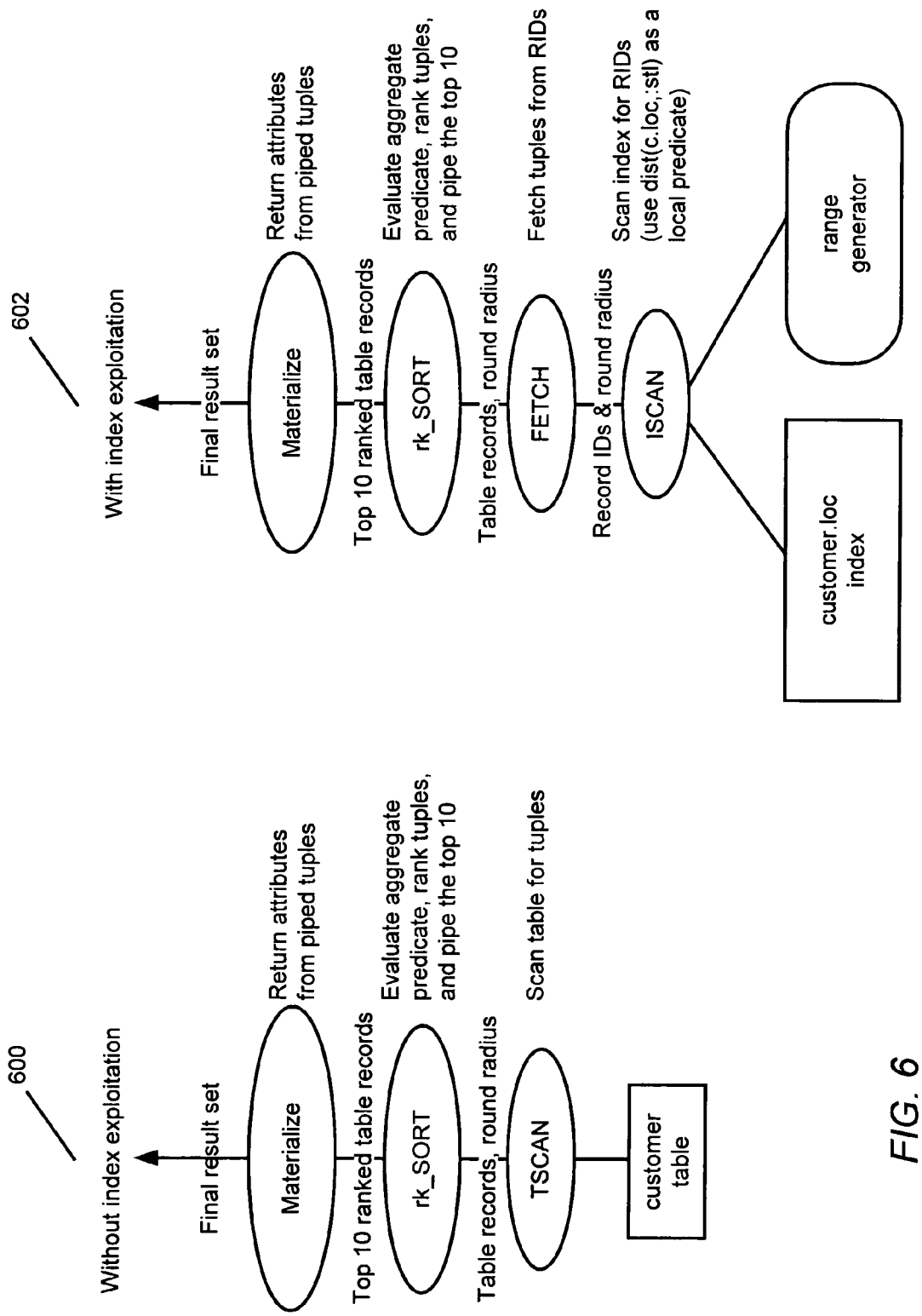
FIG. 6 is a diagram illustrating an access plan without index exploitation and an access plan with index exploitation for two queries.

The above statement selects the top 10 customers with highest income, and the statement uses a table attribute (i.e., the income column of the customer table) rather than a UDF as the aggregate predicate. FIG. 6 is a diagram illustrating an access plan 600 without index exploitation and an access plan 602 with index exploitation that both of the above queries would generate. Note that the second statement requires an index on customer.income, not customer.loc, in order to be able to exploit it.

Without index exploitation, in access plan 600, the TSCAN node scans the customer table for tuples. The table records and round radius are passed from the TSCAN node to the rk_SORT node. The rk_SORT node evaluates the aggregate predicate, ranks tuples, and pipes the top 10 to the MATERIALIZE node returns attributes from the piped tuples in the final result set.

With index exploitation, the ISCAN node scans the customer.loc index for record identifiers (RIDs), using dist (c.loc,:stl) as a local predicate. Additionally, a range generator, which is provided by a user who knows the statistics of the data, provides range data to the ISCAN node. Then, the ISCAN node passes record identifiers and a round radius to the FETCH node. The FETCH node fetches tuples from RIDS and passes table records and the round radius to the rk_SORT node. The rk_SORT node evaluates the aggregate predicate, ranks tuples, and passes the top 10 tuples to the MATERIALIZE node, which returns attributes from the piped tuples for the final result set.

The following is an example SQL statement for an aggregate predicate in a Boolean expression:
SELECT*
FROM customer c
WHERE RANK(dist(c.loc, :stl)) ASC FIRST 10 AND c.income>50,000

Figure 7:
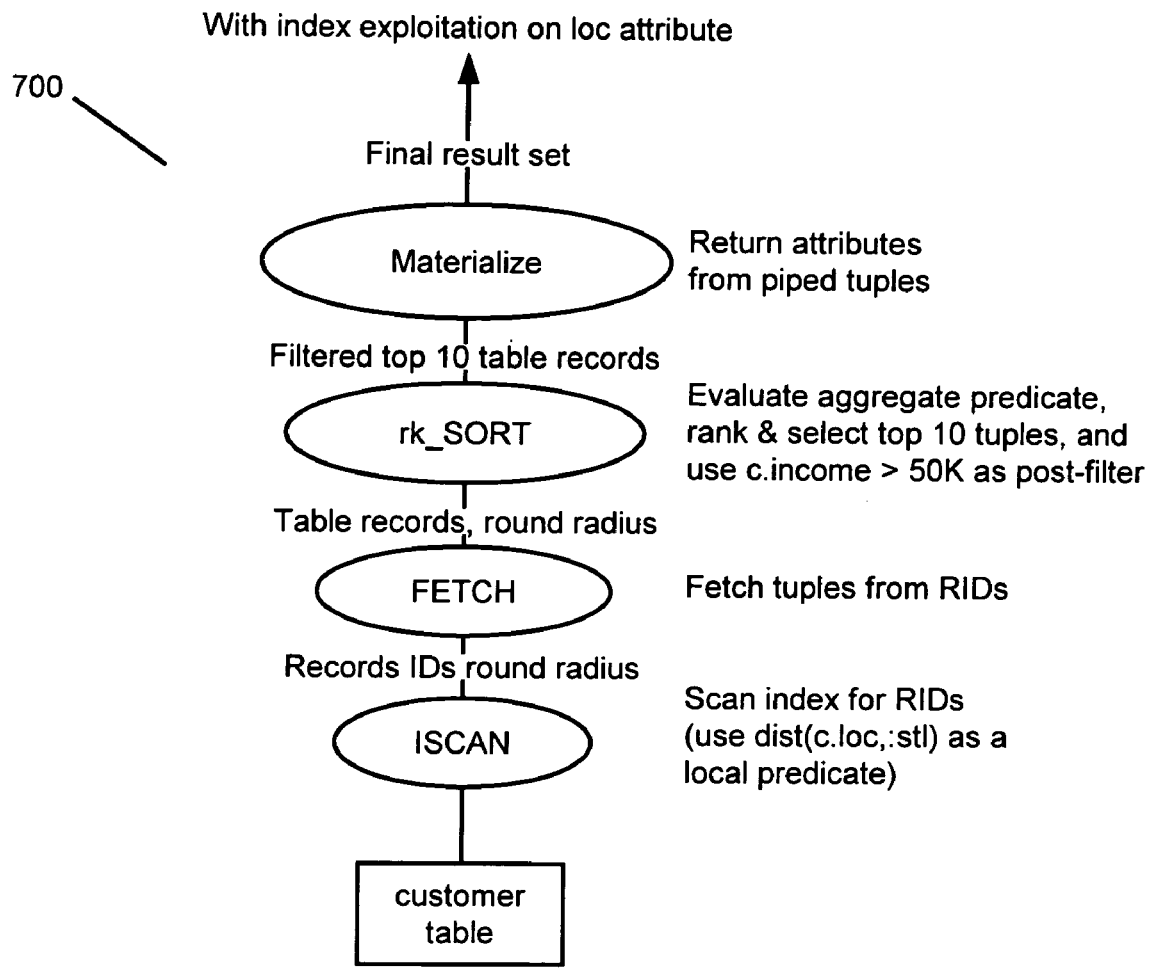
FIG. 7 is a diagram illustrating an access plan with index exploitation on the loc attribute.

The above statement selects only the customers with income greater than 50,000 from the closest 10 customers to STL (i.e., Santa Teresa Laboratory). FIG. 7 is a diagram illustrating an access plan 700 with index exploitation on the loc attribute. In particular, given an index on c.loc, the access plan 700 the above statement would generate is illustrated in FIG. 7. Note that the c.income>50,000 predicate is attached to the rk_SORT node and acts as a post-filter to the node. In particular, the ISCAN node scans the index for record identifiers (RIDs) for rows in the customer table by using (dist(c.loc, :stl) as a local predicate. Then, the ISCAN node passes record identifiers and a round radius to the FETCH node. The FETCH node fetches tuples from RIDS and passes table records and the round radius to the rk_SORT node. The rk_SORT node evaluates the aggregate predicate, ranks and selects the top 10 tuples, and uses c.income>50,000 as a post-filter. The filtered top 10 table records are passed to the MATERIALIZE node, which returns attributes from the piped tuples for the final result set.

The following is an example SQL statement for an aggregate predicate in a HAVING clause:
SELECT*
FROM customer c
WHERE c.income>50,000
HAVING RANK(dist(c.loc, :stl)) ASC FIRST 10

Figure 8:
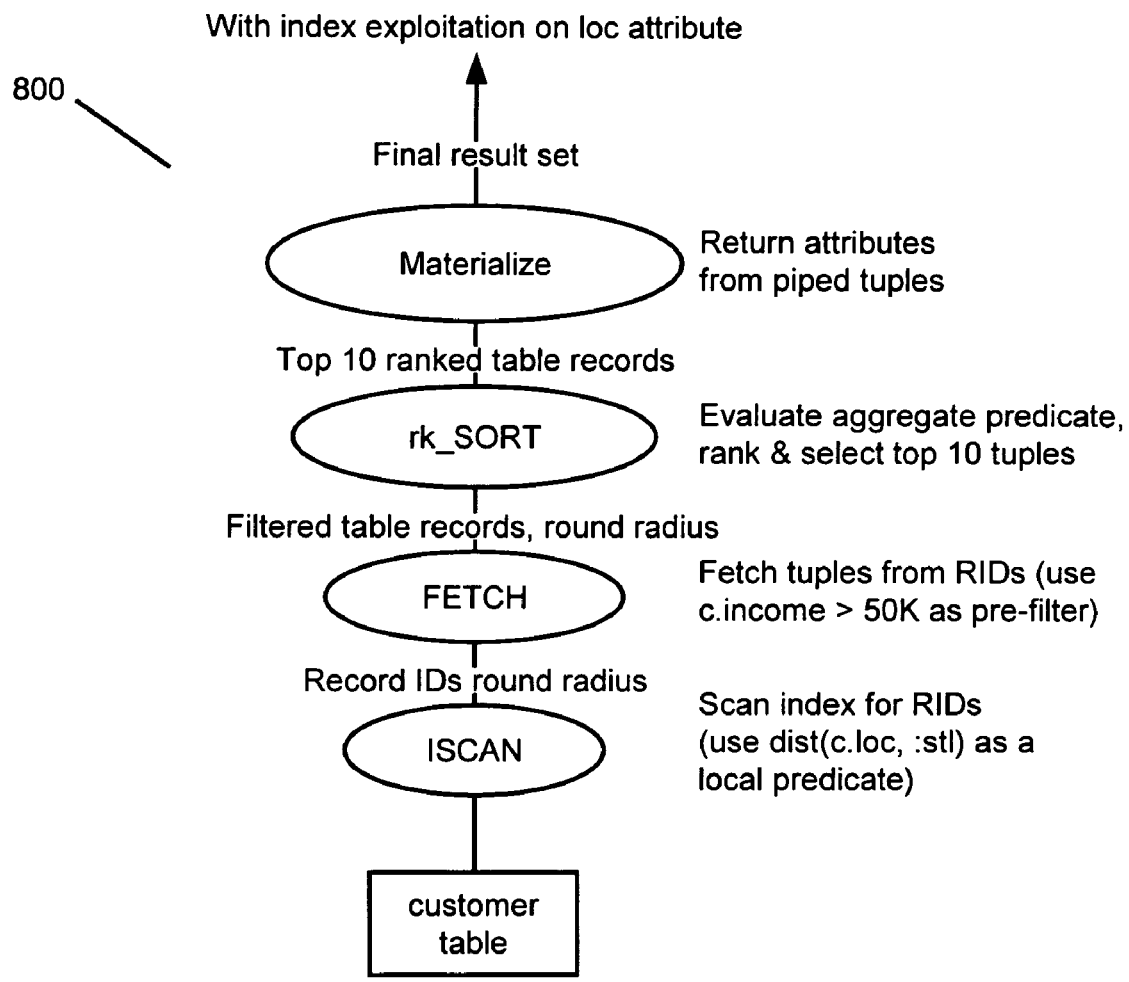
FIG. 8 is a diagram illustrating an access plan with index exploitation on a loc attribute.

The above statement selects 10 customers whose income is greater than 50,000 and who are nearest to STL (i.e., Santa Teresa Laboratory). FIG. 8 is a diagram illustrating an access plan 800 with index exploitation on a loc attribute. The access plan 800, of FIG. 8, generated for the above statement, is almost equivalent to the access plan 700 for the previous statement, but the c.income>50,000 predicate would be attached to the FETCH node before the rk_SORT node and acts as a pre-filter to the FETCH node.

In particular, the ISCAN node scans an index for record identifiers (RIDs) for records in the customer table using dist(c.loc, :stl) as a local predicate. The ISCAN node passes record identifiers and a round radius to the FETCH node. The FETCH node fetches tuples from the RIDS, using c.income>50,000 as a pre-filter. The rk_SORT node receives the table records and the round radius. Next, the rk_SORT node evaluates the aggregate predicate and ranks and selects the top 10 tuples. These are passed to the MATERIALIZE node, which returns attributes from the piped tuples as a final result set.

Figure 9:
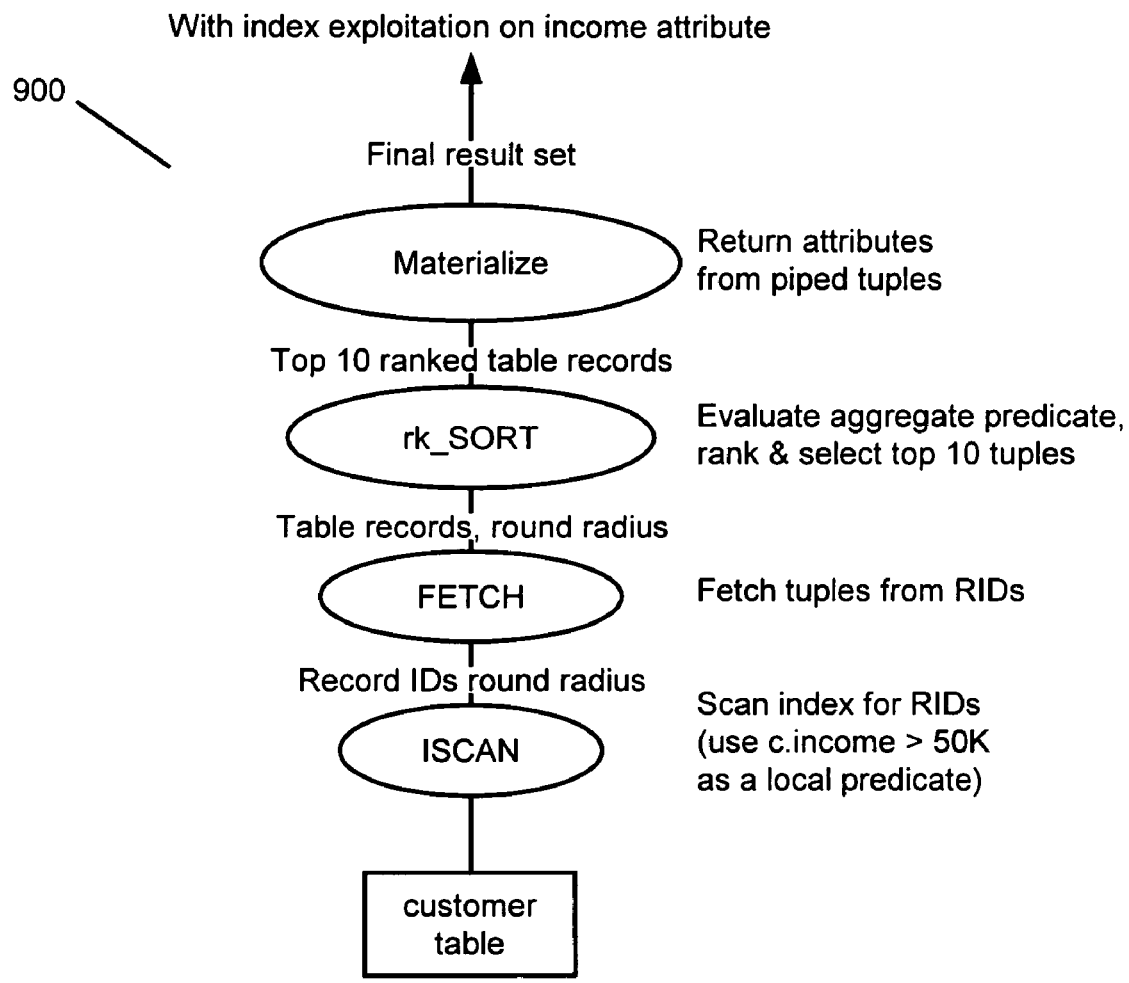
FIG. 9 is a diagram illustrating an access plan with index exploitation on an income attribute.

An alternative is to exploit an index on c.income, rather than c.loc. and then to do the ranked sort in one round. This results in the access plan 900, illustrated in FIG. 9, which is a diagram illustrating an access plan 900 with index exploitation on an income attribute. In particular, the ISCAN node scans an index for record identifiers (RIDs) for records in the customer table using c.income>50,000 as a local predicate. The ISCAN node passes record identifiers and a round radius to the FETCH node. The FETCH node fetches tuples from the RIDs. The rk_SORT node receives the table records and the round radius. Next, the rk_SORT node evaluates the aggregate predicate and ranks and selects the top 10 tuples. These are passed to the MATERIALIZE node, which returns attributes from the piped tuples as a final result set.

Figure 10:
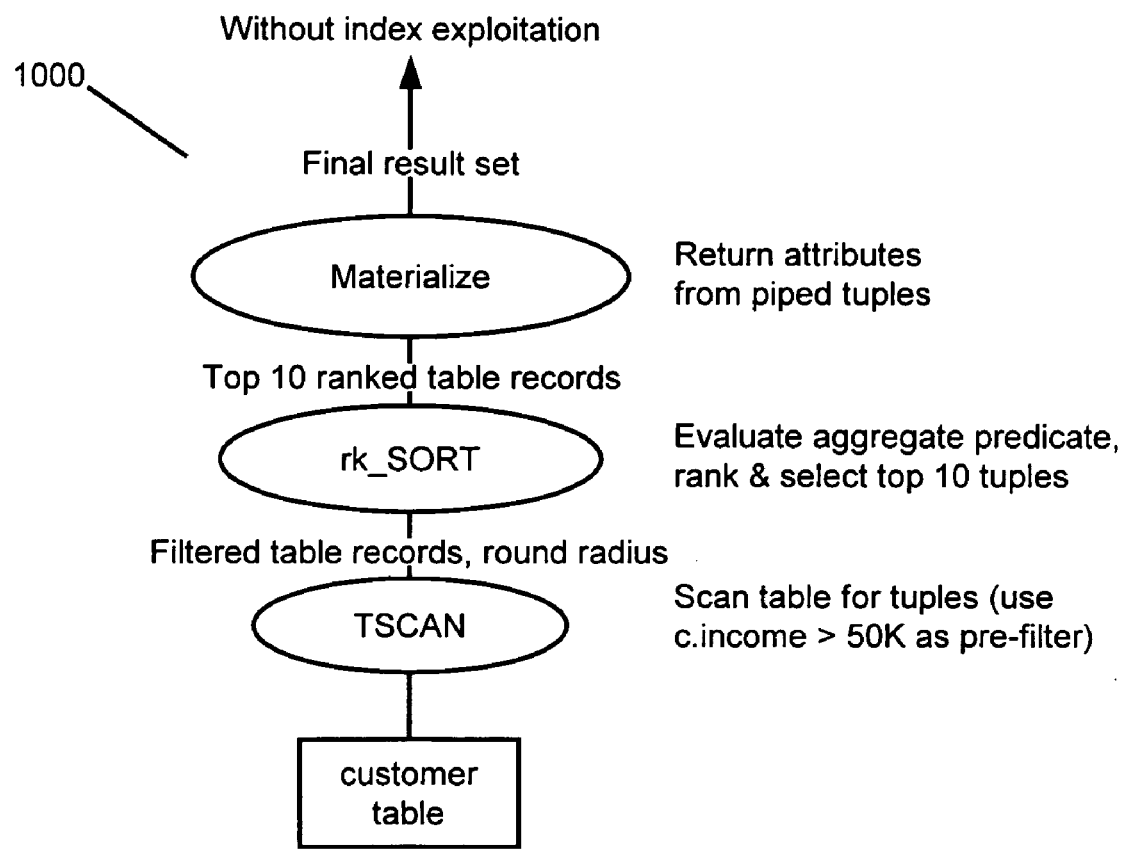
FIG. 10 is a diagram illustrating an access plan without index exploitation.

Depending on which index is available, or what the selectivity estimate for each predicate is in case both indices are available, the compiler can choose between the two access plans 800 or 900, or if no index is available, the compiler generates a straight-forward table scan access plan 1000, illustrated in FIG. 10, which is a diagram illustrating an access plan 10000 without index exploitation. For the access plan 1000, the TSCAN node scans the customer table for tuples using c.income>50,000 as a filter. The TSCAN node passes table records and a round radius to the rk_SORT node. The rk_SORT node evaluates the aggregate predicate and ranks and selects the top 10 tuples. These are passed to the MATERIALIZE node, which returns attributes from the piped tuples as a final result set.

The following is an example SQL statement for an aggregate predicate over a window in a JOIN:

SELECT*
FROM customer c, stores s
WHERE RANK(dist(c.loc, s.loc)) ASC FIRST 10 OVER (s.id)

The above statement selects the nearest 10 customers for every store location. The access plans it generates are illustrated in FIGS. 11, 12, and 13.

Figure 11:
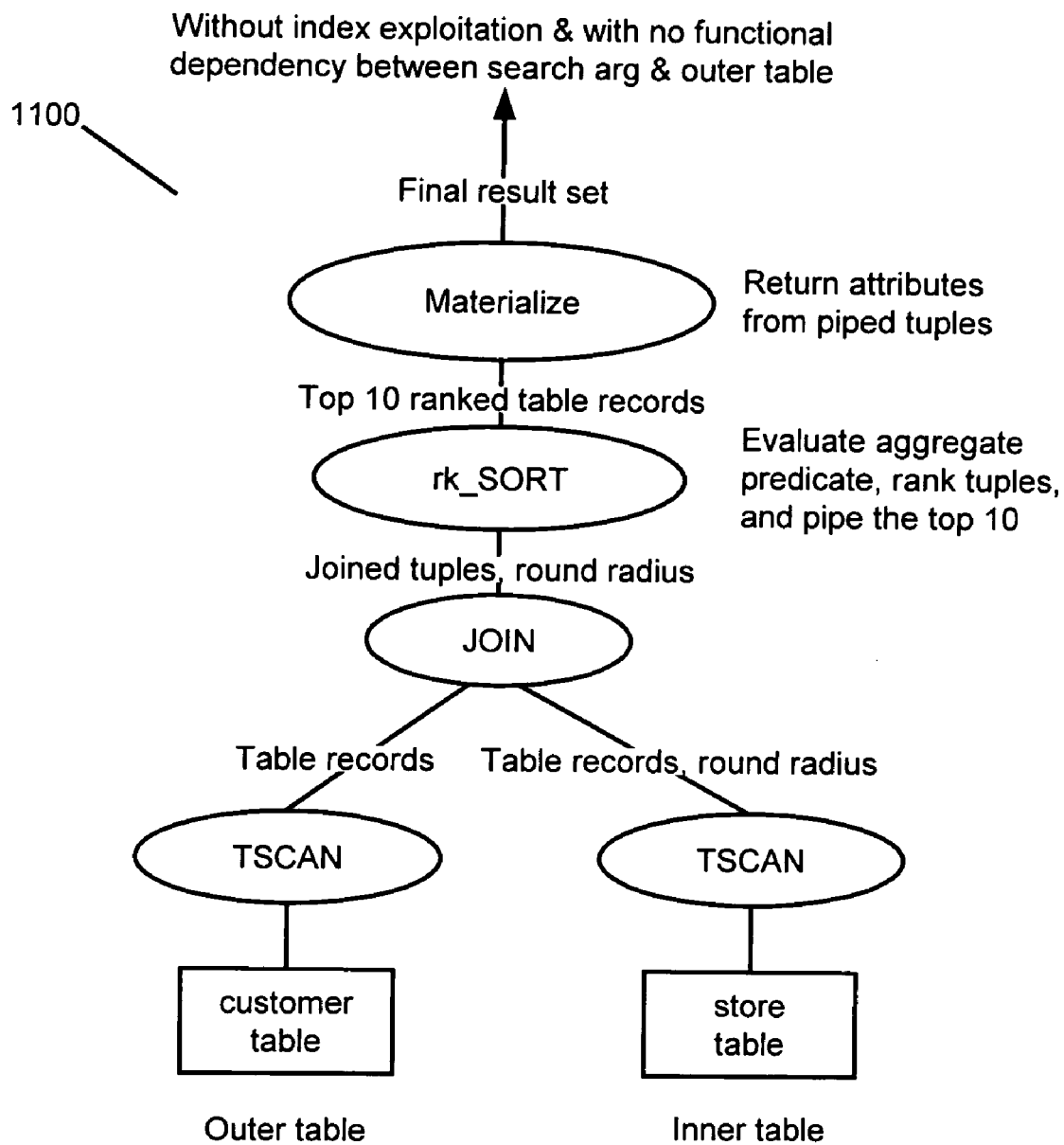
FIG. 11 is a diagram illustrating an access plan, without index exploitation and with no functional dependency between a search argument and an outer table.

FIG. 11 is a diagram illustrating an access plan 1100, without index exploitation and with no functional dependency between a search argument and an outer table. In particular, one TSCAN node scans a customer table for table records and passes these to the JOIN node. Another TSCAN node scans a store table for table records and passes these, along with a round radius, to the JOIN node. Next, the JOIN node joins the received records, and passes these on, along with the round radius, to the rk_SORT node. The rk_SORT node evaluates the aggregate predicate, ranks tuples, and passes the top 10 tuples to the MATERIALIZE node, which returns attributes from the piped tuples as a final result set.

Figure 12:
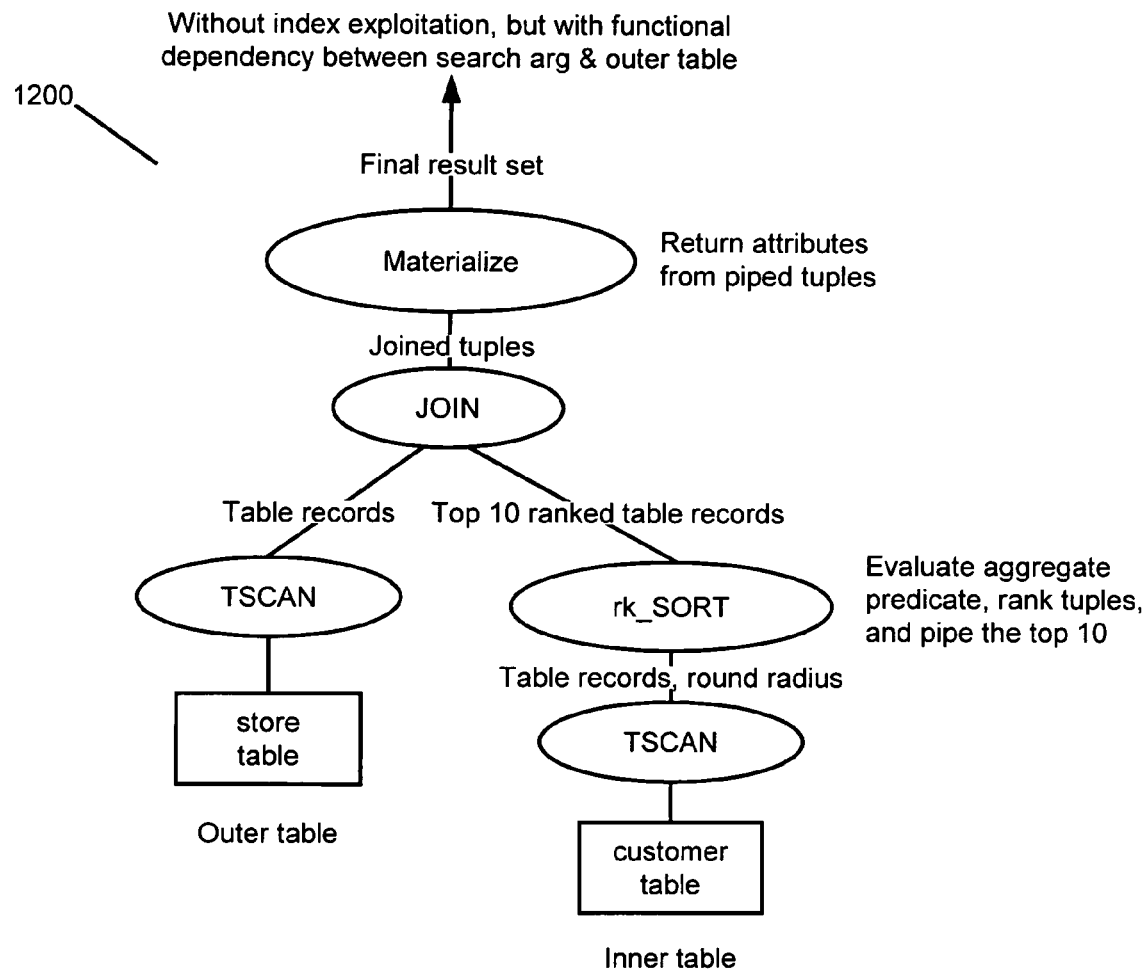
FIG. 12 is a diagram illustrating an access plan, without index exploitation, but with functional dependency between a search argument and an outer table.

FIG. 12 is a diagram illustrating an access plan 1200, without index exploitation, but with functional dependency between a search argument and an outer table. In particular, one TSCAN node scans a store table for table records and passes these to the JOIN node. Another TSCAN node scans a customer table for table records and passes these, along with a round radius, to the rk_SORT node. The rk_SORT node evaluates the aggregate predicate, ranks tuples, and passes the top 10 tuples to the JOIN node. Next, the JOIN node joins the received records, and passes these on, to the MATERIALIZE node, which returns attributes from the piped tuples as a final result set.

Figure 13:
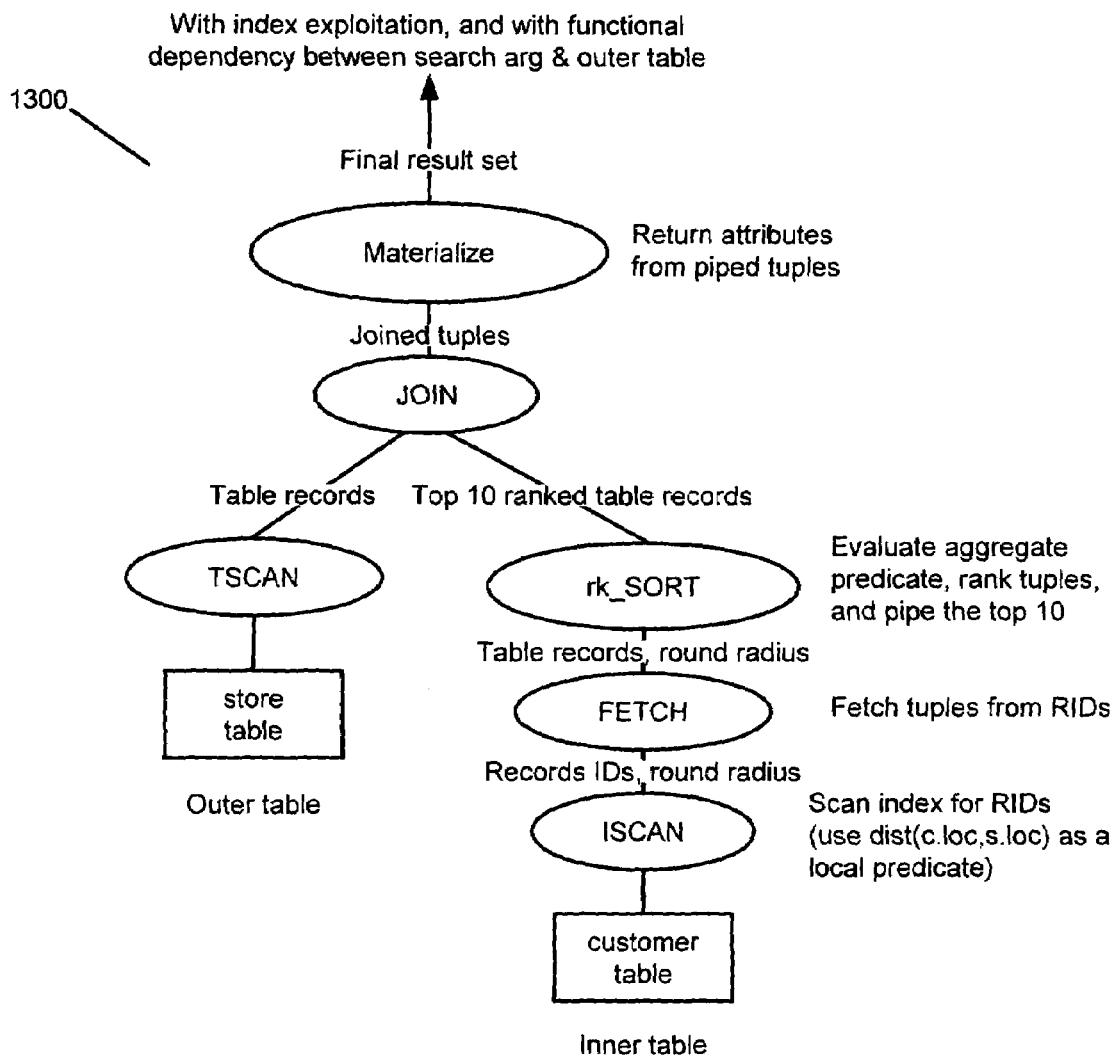
FIG. 13 is a diagram illustrating an access plan, with index exploitation and with functional dependency between a search argument and an outer table.

FIG. 13 is a diagram illustrating an access plan 1300, with index exploitation and with functional dependency between a search argument and an outer table. In particular, one TSCAN node scans a store table for table records and passes these to the JOIN node. An ISCAN node scans an index for record identifiers (RIDs) for the customer table, using dist (c.loc,s.loc) as a local predicate, and passes these, along with a round radius, to a FETCH node. The FETCH node fetches tuples from the customer table using the RIDs and passes these, along with a round radius, to the rk_SORT node. The rk_SORT node evaluates the aggregate predicate, ranks tuples, and passes the top 10 tuples to the JOIN node. Next, the JOIN node joins the received records, and passes these on, to the MATERIALIZE node, which returns attributes from the piped tuples as a final result set.

The following is an example SQL statement for an aggregate predicate in a JOIN with a GROUPBY clause:

SELECT s.id, sum(c.income)
FROM customer c, store s
WHERE within(c.loc, s.zone)=1
GROUPBY s.id HAVING RANK(sum(c.income)) DESC FIRST 10

Figure 14:
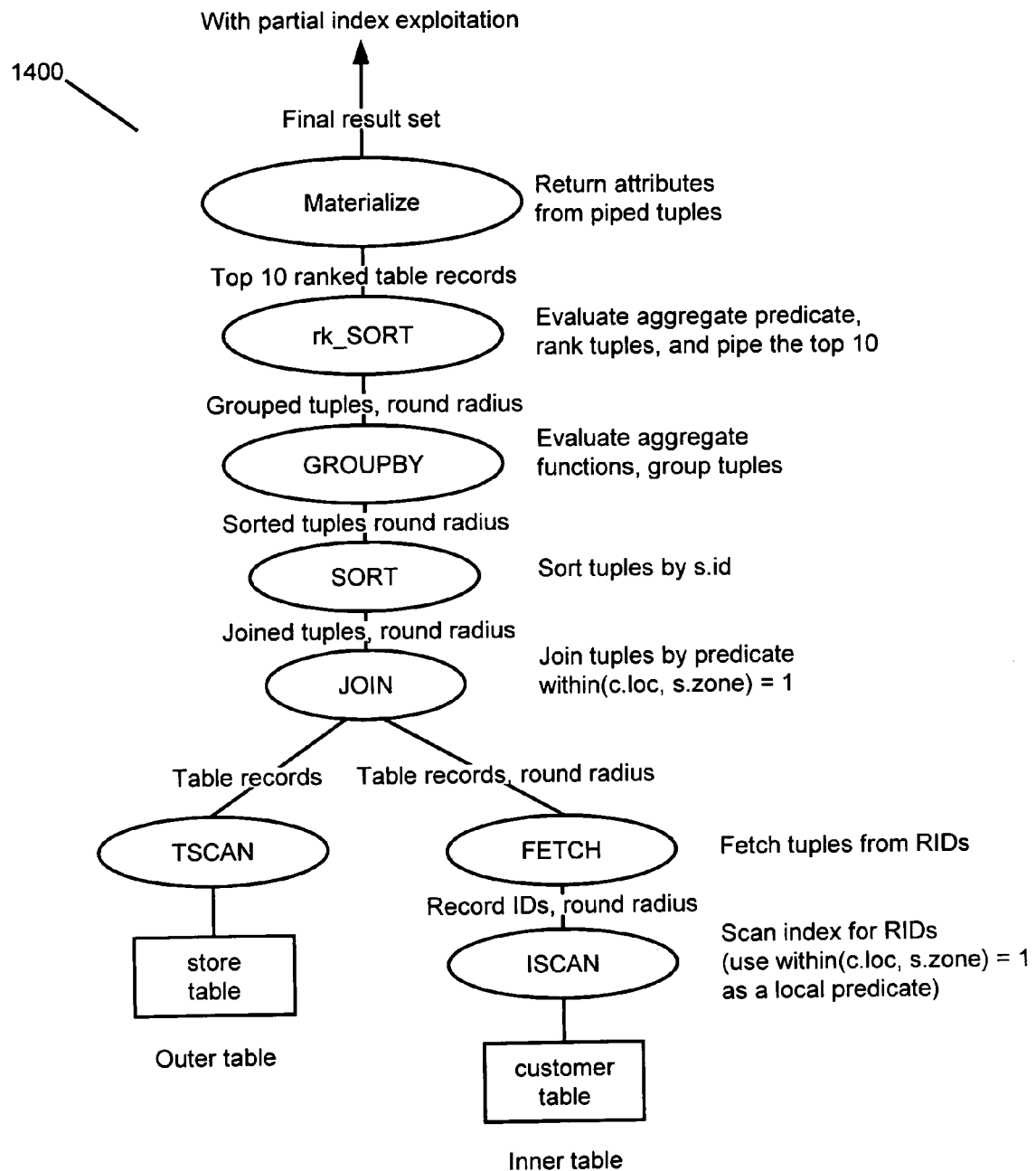
FIG. 14 is a diagram illustrating an access plan with partial index exploitation.

The above statement selects the top 10 stores serving the customers with highest overall cumulative income. In this case, the index cannot be exploited for early termination because the ranking is based on an aggregate function for each group. That function cannot be evaluated until all records from the group are fetched and sorted, so the ranking has to commence after that and cannot be terminated before the whole table is scanned. If there is an index defined on customer.loc, however, the index could be exploited to filter out some records before the ranking is begun. FIG. 14 is a diagram illustrating an access plan 1400 with partial index exploitation.

In particular, one TSCAN node scans a store table for table records and passes these to the JOIN node. An ISCAN node scans an index for record identifiers (RIDs) for the customer table, using (within(c.loc,s.zone)=1) as a local predicate, and passes these, along with a round radius, to a FETCH node. The FETCH node fetches tuples from the customer table using the RIDs and passes these, along with the round radius, to a JOIN node. Next, the JOIN node joins the received records, and passes these on, along with the round radius, to a SORT node. The SORT node sorts tuples by s.id and passes them, along with the round radius, to a GROUPBY node. The GROUPBY node evaluates aggregate functions and groups tuples. The grouped tuples and round radius are passed on to the rk_SORT node. The rk_SORT node evaluates the aggregate predicate, ranks tuples, and passes the top 10 tuples to the MATERIALIZE node, which returns attributes from the piped tuples as a final result set.

The following is an example SQL statement for an aggregate predicate with a
GROUPBY clause:
SELECT s.sizeRating, sum(c.purchases)
FROM customer c, store s
WHERE Wthin(c.loc,store.loc)=1
GROUBY s.sizeRating
HAVING RANK(s.sizeRating) DESC FIRST 10

For the above statement, suppose that the sizeRating attribute from the store table denotes the size of the customer base of a given store, according to some external rating. The above statement would then return the total sales for the stores from each of the top ten size groups. Even though the aggregate predicate in this case, store.sizeRating, is an attribute, and not an aggregate function as in the previous example, the above statement would not be able to exploit any index on store.sizeRating because the ranking is performed on the group records, not on individual table records. The access plan generated for this statement would, therefore, be identical to access plan 1400, if there is an index defined on store.loc. If there is no index to be exploited, the access plan would be a straight-forward table scan access plan.

E. Flow Diagrams

Figure 15:
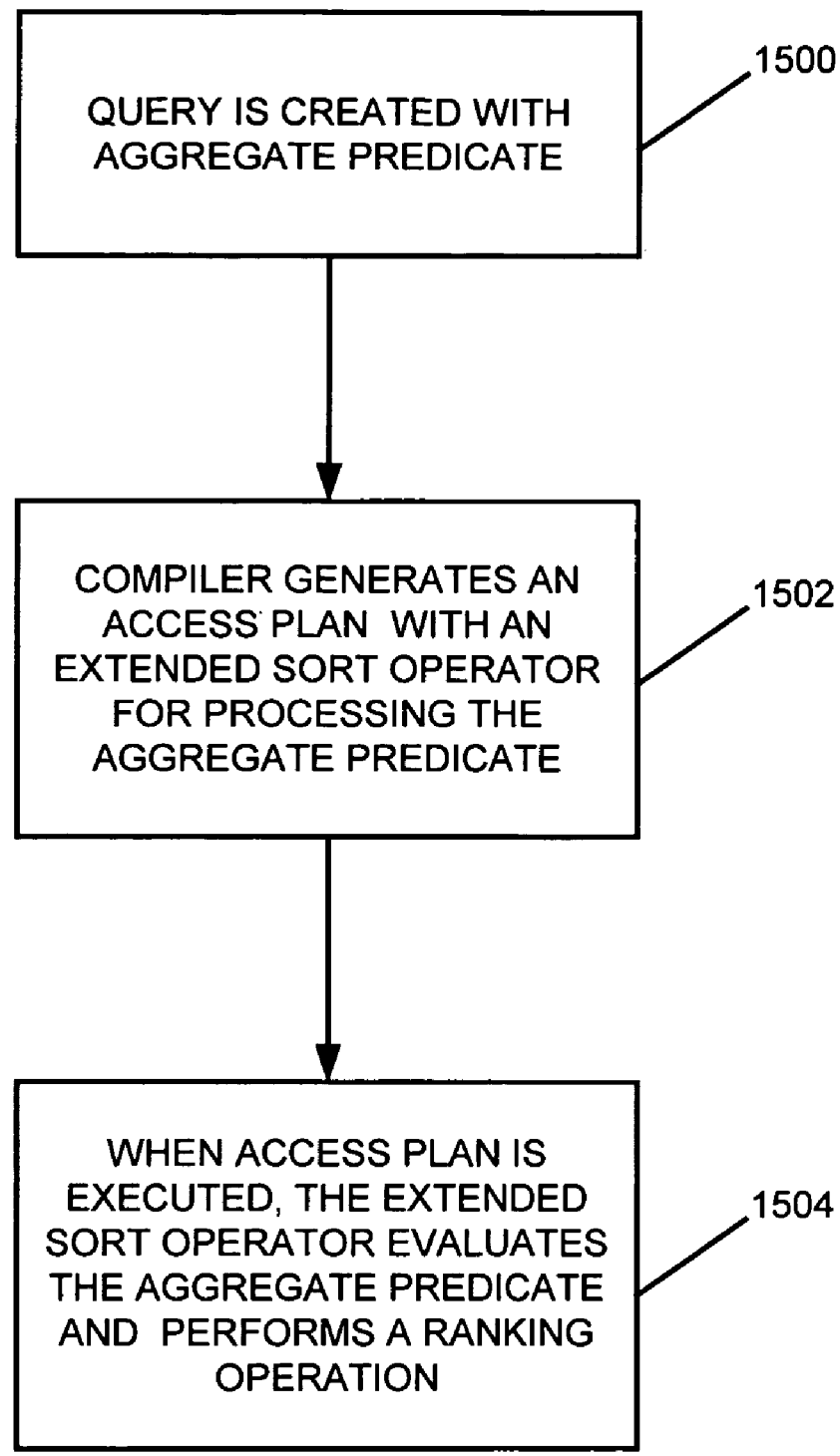
FIG. 15 is a flow diagram illustrating the process of using the invention.

FIG. 15 is a flow diagram illustrating the process of using the invention. In particular, Block 1500 represents a query being created with an aggregate predicate. Block 1502 represents a compiler generating an access plan with an extended sort operator (rk_sort) for processing the aggregate predicate. Block 1504 represents, executing the access plan and, when it is executed, evaluating the aggregate predicate and performing a ranking operation.

Figure 16A:
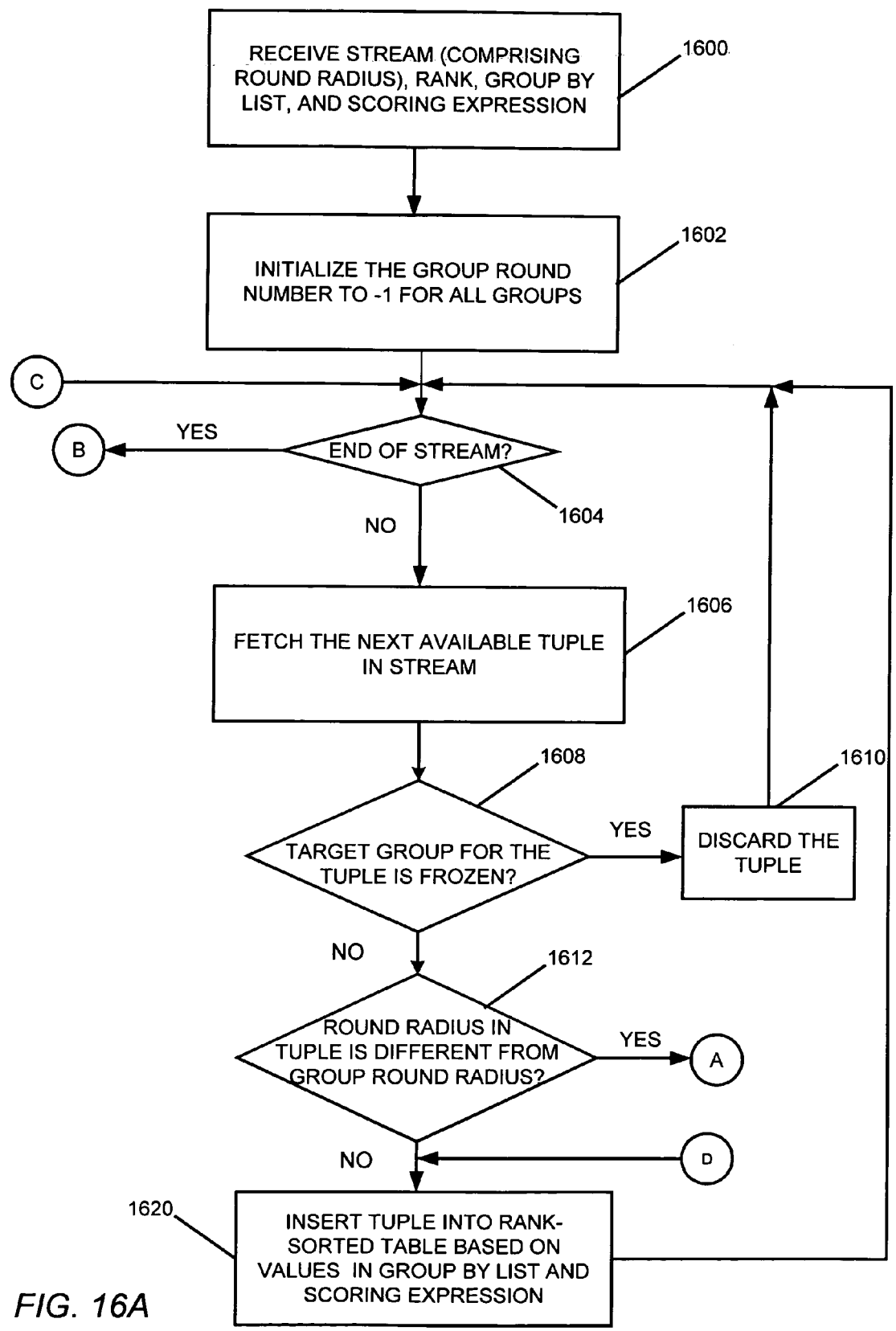
FIGS. 16A–C are a flow diagram illustrating the processing of the extended sort operator (rk_sort) to process an aggregate predicate.
Figure 16B:
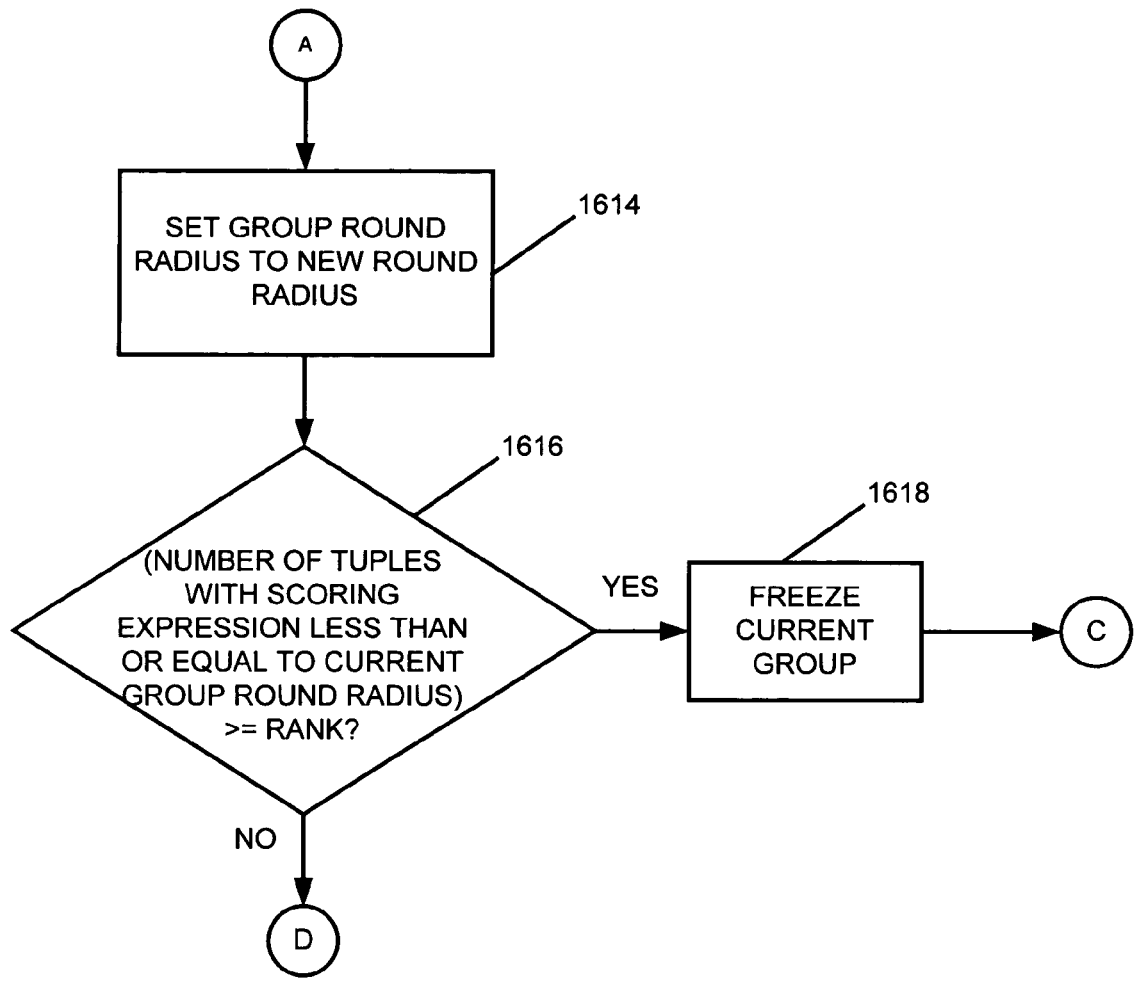
Figure 16C:
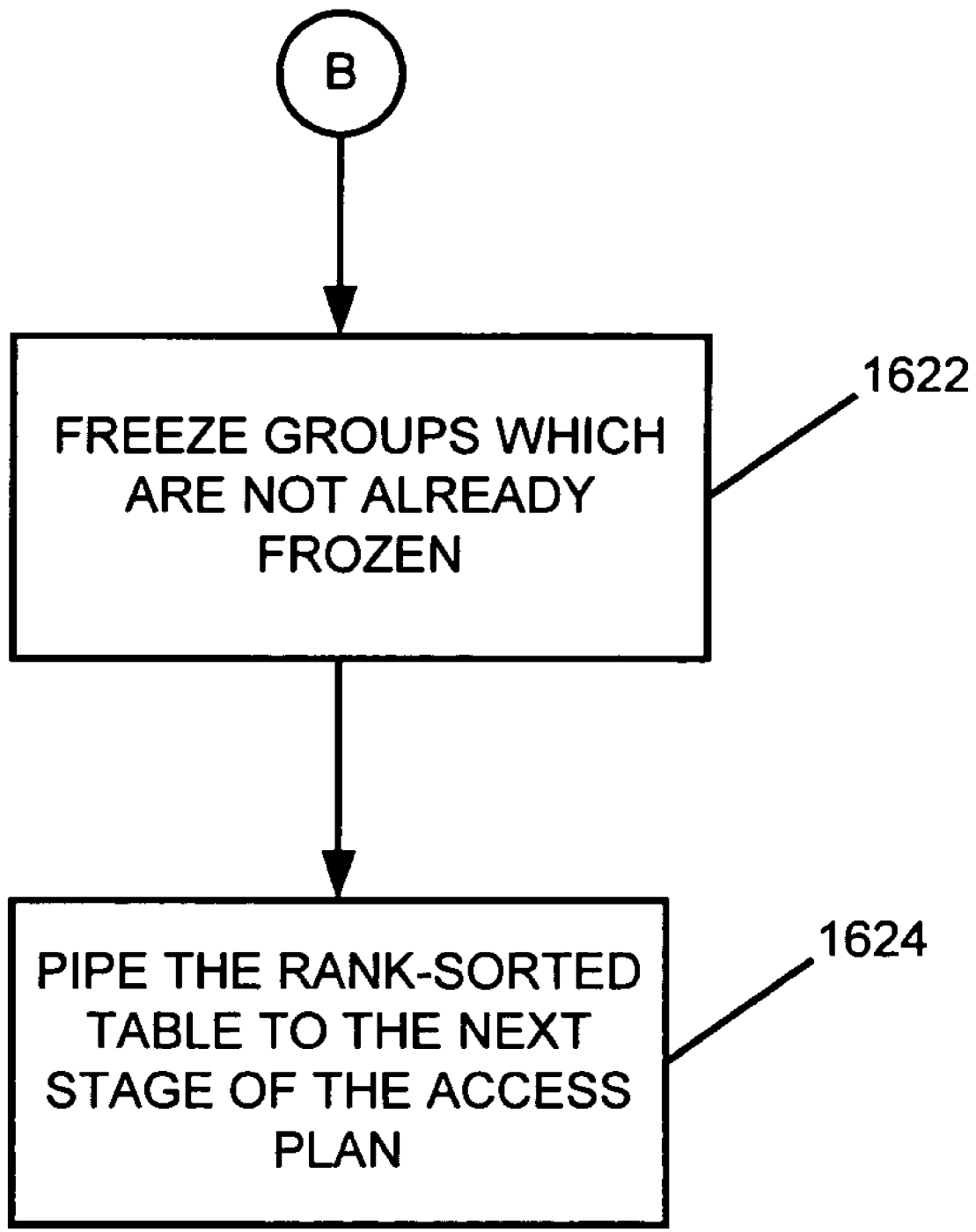

FIGS. 16A–C are a flow diagram illustrating the processing of the extended sort operator (rk_sort) to process an aggregate predicate. Block 1600 represents the extended sort operator receiving a stream (comprising a round radius), a rank, a group by list, and a scoring expression. The stream consists of tuples, with each tuple having a column value for a round radius. The rank corresponds to the numeric-expression, the group by list corresponds to the window-specification, and the scoring expression corresponds to the scalar-expression of an aggregate predicate.

Block 1602 represents the extended sort operator initializing the group round number to –1 for all groups. In Block 1604, the extended sort operator determines whether it is the end of stream (i.e., whether all tuples have been processed). If it is the end of stream, the extended sort operator continues to Block 1622, otherwise, the extended sort operator continues to Block 1606.

In Block 1606, the extended sort operator fetches the next available tuple in the stream. In Block 1608, the extended sort operator determines whether the target group for the tuple is frozen. If so, the extended sort operator continues to Block 1610, otherwise, the extended sort operator continues to Block 1612. In Block 1610, the extended sort operator discards the tuple and loops back to Block 1604.

In Block 1612, the extended sort operator determines whether the round radius in the tuple is different from the group round radius. If so, the extended sort operator continues to Block 1614, otherwise, the extended sort operator continues to Block 1620.

In Block 1614, the extended sort operator sets the group round radius to the new round radius. In Block 1416, the extended sort operator determines whether (the number of tuples with scoring expression less than or equal to the current group round radius) is greater than or equal to rank (i.e., the desired number of tuples). If so, the extended sort operator continues to Block 1618, otherwise, the extended sort operator continues to Block 1620. In Block 1618, the extended sort operator freezes the current group (i.e., indicates that no more tuples will be processed for the group). Then, the extended sort operator loops back to Block 1604.

In Block 1620, the extended sort operator inserts a tuple into a sorted table based on values in the group by list and the scoring expression. Then, the extended sort operator loops back to Block 1604.

In Block 1604, if the end of the stream is reached, the extended sort operator continues to Block 1622 and freezes groups which are not already frozen. Then, the extended sort operator pipes the rank-sorted table to the next stage of the access plan.

F. Additional Advantages of the Invention

This section provides some additional advantages of the invention. These stated advantages are provided for illustration only and do not represent all of the advantages of the invention.

Several approaches have been explored to support aggregate predicates. One approach is to develop indexing mechanisms that target specific applications. For example, evaluation of nearest neighbor queries has been investigated using R-trees in Nick Roussopoulos, Stephen Kelley and Frederic Vincent, "Nearest Neighbor Queries," Proceedings of the 1995 ACM-SIGMOD International Conference on Management of Data, San Jose, Calif.

New indexing data structures have also been developed, such as SS-trees, in D.A. White and R. Jain, "Similarity Indexing with the SS-tree," Proceedings of the 12th IEEE International Conference on Data Engineering, February 1996, pages 516–523. While this approach works for specific domains, new applications will require new implementations of the usual tree facilities for search, concurrency and recovery. The cost of implementing such trees for a specific application is high.

Another approach is to developed generalized search trees that support nearest neighbor and ranked search. This approach is exemplified by the extension of GiST in Paul Aoki, "Generalizing "Search" in Generalized Search Trees." This approach has the advantage of extensibility by allowing users to control every step of the traversal of a tree. The disadvantage is that such user control is often accomplished through user-defined functions. Invoking a user-defined function at each step of the tree traversal can cause heavy runtime overhead.

The third approach is to reduce a top-k selection queries to a normal selection query using a range, e.g., as described by Surajit Chaudhuri and Luis Gravano, "Evaluating Top-k Selection Queries," Proceedings of the 25th VLDB Conference, 1999. The main problem with this approach is that there is a need to determine a corresponding range query at compile time for a top-k selection query. If the estimate at compile time is not correct, it may not be able to obtain answers to the top-k selection query.

The invention described herein has several advantages. First, the invention is extensible in the sense that users can control ranked search, avoiding the shortcomings of a domain specific approach. Second, such control is exercised at a high level in the framework by generating a sequence of search ranges that are used by the underlying access methods. This avoids the runtime overhead of the approach in GiST. Third, the invention is dynamic and incremental.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a statement in a computer to manipulate data in a data store connected to the computer, the method comprising:

receiving a statement having a rank operator for specifying an aggregate predicate; and when evaluating the statement, processing the aggregate predicate to produce a rank-sorted set of tuples by performing an extended sort on an input stream of tuples using a rank, a group-by list and a scoring expression.

2. The method of claim 1, wherein the aggregate predicate is contained in a search condition.

3. The method of claim 1, wherein the aggregate predicate comprises a numeric-expression.

4. The method of claim 1, wherein the aggregate predicate comprises an ordering indicator.

5. The method of claim 1, wherein the agate predicate comprises a window-specification.

6. The method of claim 1, wherein the aggregate predicate comprises a scalar-expression.

7. The method of claim 1, wherein evaluating comprises performing an extended sort operator.

8. The method of claim 7, wherein the extended sort operator is part of an access plan.

9. The method of claim 7, wherein performing the extended sort operator comprises receiving a stream comprising one or more tuples, a rank, a group by list comprising zero or more groups, and a scoring expression.

10. The method of claim 9, further comprising, for each tuple in the stream, discarding the tuple if its target group is frozen.

11. The method of claim 9, further comprising:
determining a group round radius; and
when the tuple has a different round radius than the group round radius,
setting the group round radius to that round radius; and
if a desired number of tuples have been identified for the group, freezing the group.

12. The method of claim 9, further comprising inserting the tuple into a rank-sorted table based on values in the group by list and scoring expression.

13. The method of claim 9, further comprising, when all tuples in the stream have been processed, freezing the groups that have not already been frozen.

14. An apparatus for executing a statement to manipulate data, comprising:
a computer having a data store connected thereto, wherein the data store stores data; and
one or more computer programs, performed by the computer, for receiving a statement having a rank operator for specifying an aggregate predicate and when evaluating the statement, processing the aggregate predicate to produce a rank-sorted set of tuples by performing an extended sort on an input stream of tuples using a rank, a group-by list and a scoring expression.

15. The apparatus of claim 14, wherein the aggregate predicate is coined in a search condition.

16. The apparatus of claim 14, wherein the aggregate predicate comprises a numeric-expression.

17. The apparatus of claim 14, wherein the aggregate predicate comprises an ordering indicator.

18. The apparatus of claim 14, wherein the aggregate predicate comprises a window-specification.

19. The apparatus of claim 14, wherein the aggregate predicate comprises a scalar-expression.

20. The apparatus of claim 14, wherein the evaluating comprises performing an extended sort operator.

21. The apparatus of claim 20, wherein the extended sort operator is part of an access plan.

22. The apparatus of claim 20, wherein performing the extended sort operator comprises receiving a stream comprising one or more tuples, a rank, a group by list comprising zero or more groups, and a scoring expression.

23. The apparatus of claim 22, further comprising, for each tuple in the stream, discarding the tuple if its target group is frozen.

24. The apparatus of claim 22, further comprising:
determining a group round radius; and
when the tuple has a different round radius than the group round radius,
setting the group round radius to that round radius; and
if a desired number of tuples have been identified for the group, freezing the group.

25. The apparatus of claim 22, further comprising inserting the tuple into a rank-sorted table based on values in the group by list and scoring expression.

26. The apparatus of claim 22, further comprising, when all tuples in the stream have been processed, freezing the groups that have not already been frozen.

27. An article of manufacture comprising a computer program carrier readable by a computer and embodying one or more instructions executable by the computer to perform method steps for executing a statement in a computer to manipulate data in a data store connected to the computer, comprising:
receiving a statement having a rank operator for specifying an aggregate; and
when evaluating the statement, processing the aggregate predicate to produce a rank-sorted set of tuples by performing an extended sort on an input stream of tuples using a rank, a group-by list and a scoring expression.

28. The article of manufacture of claim 27, wherein the aggregate predicate is contained in a search condition.

29. The article of manufacture of claim 27, wherein the aggregate predicate comprises a numeric-expression.

30. The article of manufacture of claim 27, wherein the aggregate predicate comprises an ordering indicator.

31. The article of manufacture of claim 27, wherein the aggregate pr comprises a window-specification.

32. The article of manufacture of claim 27, wherein the aggregate predicate comprises a scalar-expression.

33. The article of manufacture of claim 27, wherein evaluating comprises performing an extended sort operator.

34. The article of manufacture of claim 33, wherein the extended sort operator is part of an access plan.

35. The article of manufacture of claim 33, wherein performing the extended sort operator comprises receiving a stream comprising one or more tuples, a rank, a group by list comprising zero or more groups, and a scoring expression.

36. The article of manufacture of claim 35, further comprising for each tuple in the steam, discarding the tuple if its target group is frozen.

37. The article of manufacture of claim 35, further comprising:
determining a group round radius; and
when the tuple has a different round radius than the group round radius,
setting the group round radius to that round radius; and
if a desired number of tuples have been identified for the group, freezing the group.

38. The article of manufacture of claim 35, further comprising inserting the tuple into a rank-sorted table based on values in the group by list and scoring expression.

39. The article of manufacture of claim 35, further comprising, when all tuples in the stream have been processed, freezing the groups that have not already been frozen.

* * * * *